United States Patent [19]

Fritzsche

[11] Patent Number: 4,951,377
[45] Date of Patent: Aug. 28, 1990

[54] CORE SIZING METHOD

[75] Inventor: Harold L. Fritzsche, Rapid City, S. Dak.

[73] Assignee: General Electric Company, Fort Wayne, Ind.

[21] Appl. No.: 389,810

[22] Filed: Aug. 4, 1989

Related U.S. Application Data

[60] Continuation of Ser. No. 220,800, Jul. 18, 1988, which is a division of Ser. No. 934,889, Nov. 25, 1986, Pat. No. 4,794,778, which is a continuation-in-part of Ser. No. 904,140, Sep. 4, 1986, Pat. No. 4,796,451, which is a division of Ser. No. 660,211, Oct. 12, 1984, Pat. No. 4,613,780.

[51] Int. Cl.$^5$ .............................................. H02K 15/02
[52] U.S. Cl. ..................................... 29/596; 29/609; 72/354; 72/355; 72/363; 72/402; 72/353.2; 72/354.2
[58] Field of Search ................... 29/596, 598, 609, 732, 29/736; 72/354, 355, 363, 402

[56]  References Cited

U.S. PATENT DOCUMENTS

| | | |
|---|---|---|
| 1,623,766 | 4/1927 | Way . |
| 1,920,155 | 7/1933 | Fisher . |
| 1,920,354 | 8/1933 | Carpenter ........................... 171/252 |
| 3,095,774 | 7/1963 | Hart ..................................... 83/37 |
| 3,243,623 | 3/1966 | Hart et al. ........................... 310/216 |
| 3,283,399 | 11/1966 | Hart et al. ............................. 29/598 |
| 3,577,851 | 5/1971 | Detheridge ......................... 310/216 |
| 3,606,674 | 9/1971 | Given .................................... 29/596 |
| 3,708,706 | 1/1973 | Akiyama et al. .................... 310/216 |
| 3,886,256 | 5/1975 | Ohuchi ................................. 310/216 |
| 3,958,325 | 5/1976 | Rick et al. ............................. 29/596 |
| 4,102,040 | 7/1978 | Rich .................................... 310/216 |
| 4,116,033 | 9/1978 | Iwaki et al. ........................... 29/596 |
| 4,193,281 | 3/1980 | Kulikow .............................. 29/596 |
| 4,202,196 | 5/1985 | Asai et al. ............................. 29/596 |
| 4,206,624 | 6/1980 | Asai et al. ............................. 72/131 |
| 4,423,343 | 12/1983 | Field, II ............................... 310/216 |
| 4,450,704 | 5/1985 | Schaeffler et al. ................ 72/354 X |
| 4,644,775 | 2/1987 | Fuchs, Jr. ............................. 72/402 |
| 4,649,731 | 3/1987 | Eisenmann ........................... 72/402 |
| 4,653,162 | 3/1987 | Ferguson et al. .................... 72/402 |
| 4,677,834 | 7/1987 | Retallick .............................. 72/402 |
| 4,745,675 | 5/1988 | Marko et al. ......................... 29/596 |

FOREIGN PATENT DOCUMENTS

| | | |
|---|---|---|
| 85905345.6 | 10/1985 | European Pat. Off. . |
| 0139529 | 12/1979 | German Democratic Rep. ..................................... 310/216 |
| 60-504703 | 10/1985 | Japan . |

Primary Examiner—Carl E. Hall
Attorney, Agent, or Firm—Ralph E. Krisher, Jr.

[57] ABSTRACT

A method for predeterminately sizing a core using a pair of generally opposed die means operable for compressing only an outer circumferential section of the core defined generally axially between a pair of opposite end faces of the core at least generally adjacent an outer circumferential surface thereof, respectively. A pair of sizing means are operable for disposition in confronting and predetermined radially spaced apart relation with the outer circumferential surface and a plurality of tooth tip rows defining an inner circumferential surface of the core between the opposite end faces thereof, and the outer circumferential surface and the tooth tip rows of the core are displaced generally radially inwardly thereof into sizing engagement with the sizing means thereby to effect the predetermined sizing of the inner and outer circumferential surfaces of the core in response to the compressing of only the outer circumferential section of the core by the opposed die means, respectively.

40 Claims, 10 Drawing Sheets

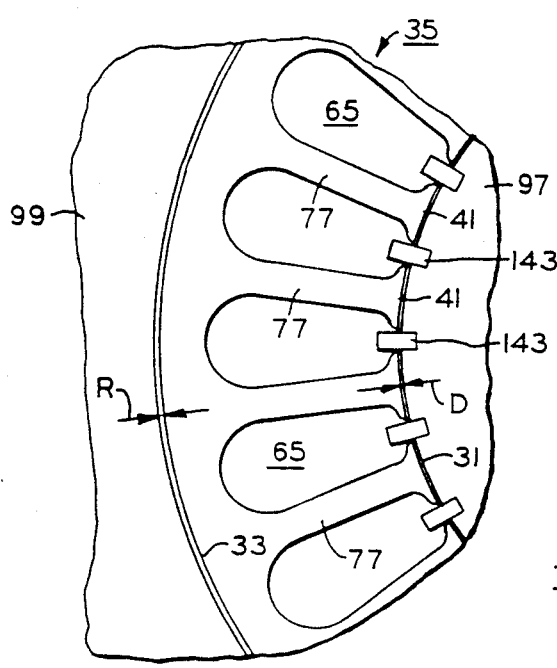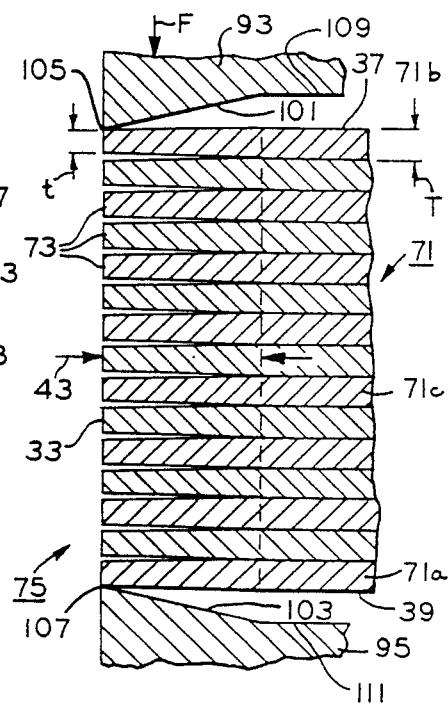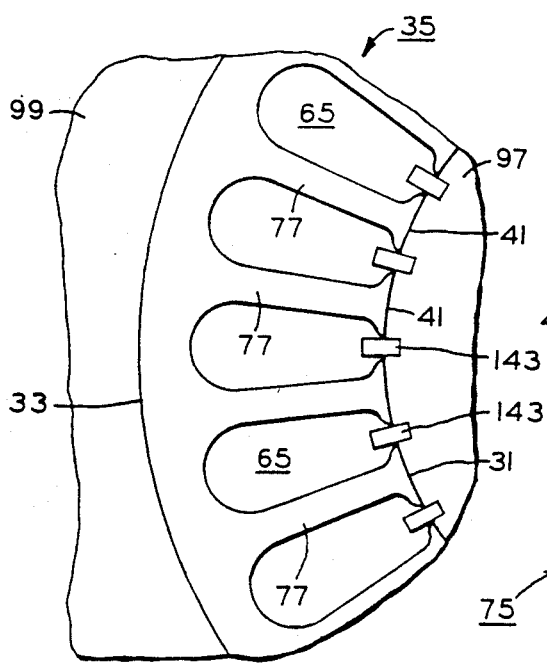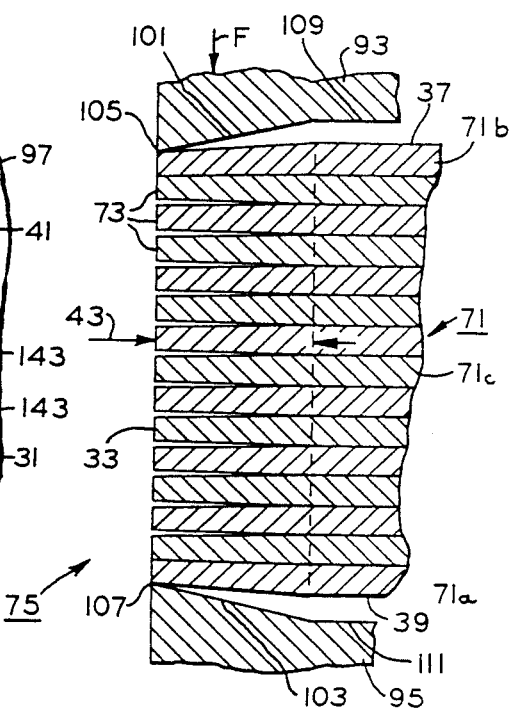

CORE SIZING METHOD

CROSS-REFERENCE TO RELATED APPLICATION

This application is a continuation of the commonly assigned copending application Ser. No. 220,300 filed July 18, 1988 which is a division of application Ser. No. 934,889 filed Nov. 25, 1986 (now U.S. Pat. No. 4,794,778 issued Jan. 3, 1989) which is a continuation-in-part of application Ser. No. 904,140 filed Sept. 4, 1986 (now U.S. Pat. No. 4,796,451 issued Jan. 10, 1989) which is a division of application Ser. No. 660,211 filed Oct. 12, 1984, (now U.S. Pat. No. 4,613,780 issued Sept. 23, 1986) and such applications Ser. No. 220,800, Sec. No. 934,889, Sec. No. 904,140 and Sec. No. 660,211 are incorporated herein by reference.

FIELD OF THE INVENTION

This invention relates in general to dynamoelectric machines and in particular to a method of predeterminately sizing a core adapted for use in a dynamoelectric machine to predeterminately size a core.

BACKGROUND OF THE INVENTION

In the past various schemes have been employed to fabricate and size a core for a dynamoelectric machine, and such cores have been both of the edgewise wound type and the interfacing individual lamination type. Common to the edgewise wound and lamination type core was that each had a pair of opposite end faces interconnected between inner and outer circumferential surfaces. A yoke of these past cores was bounded by the outer circumferential surface thereof, and a plurality of tooth rows interposed between the opposite end faces extended on preselected pitch axes from the yoke with the tips of the teeth, or tooth tip rows, defining the inner circumferential surface or bore of the past cores.

In one of the past core sizing schemes, the bore of the core was burnished thereby to remove burrs or the like which may have been present on the inner circumferential edges of at least some of the laminations comprising such bore, and it is believed that such a burnishing operation may have had some sizing effect on the bore of the core. However, at least one disadvantageous or undesirable feature of the aforementioned burnishing operation is believed to be that it sized only the inner circumferential surface of the core.

In another of the past core sizing schemes, a cylindric sizing rod or arbor was forced into sizing engagement with the bore of the past edgewise wound core, and since the diameter of the sizing arbor was predeterminately greater than that of the bore, both the bore and the outer circumferential surface of the core were expanded generally radially outwardly thereof. During the sizing engagement of the sizing arbor with the bore of the core, the opposite end faces of the core were compressed in sizing engagement between a pair of die surfaces on a pair of opposed dies with the die surfaces engaging the opposite end faces in their entireties, respectively. One of the disadvantageous or undesirable features of this past core sizing scheme is believed to be that the compressive force exerted by the die surfaces onto the tooth rows of the core between the opposite end faces thereof may have been of such magnitude as to have had the tendency to angularly displace the individual teeth in the tooth rows with respect to each other. At least another disadvantageous or undesirable feature of this past core sizing scheme is believed to be that the outer circumferential surface was not sized upon the expansion thereof generally radially outwardly of the core. Still another disadvantageous or undesirable feature of this past core sizing scheme is believed to be that the yoke section of such past core may have deflected axially in response to the sizing engagement of the sizing arbor with the bore of such past core resulting in core laminations having a generally curved geometry and not suitable for farther manufacturing.

In still another of the past core sizing scheme, another sizing arbor similar to that discussed above was forced into sizing engagement with the bore of the past lamination type core, and since the diameter of the sizing arbor was greater than that of the bore, both the bore and the outer circumferential surface of the core were expanded generally radially outwardly thereof, but only portions of the outer circumferential surface of the core adjacent the opposite end faces thereof were expanded into sizing engagement with a pair of sizing rings therefor. Upon the sizing engagement of the sizing arbor with the bore of the core, the opposite end faces of the core were compressed in sizing engagement between a pair of die surfaces on a pair of opposed dies with the die surfaces engaging the opposite end faces in their entirety, respectively. Further, the die faces were provided with a pair of opposed ring-shaped platforms which formed opposite annular recesses in the opposite end faces of the core adjacent the aforementioned sized portions of the outer circumferential surface thereof, respectively. One of the disadvantageous or undesirable features of this past core sizing scheme is believed to be that the compressive force exerted by the die surfaces onto the tooth rows of the core between the opposite end faces thereof may have been of such magnitude as to have had the tendency to angularly displace the individual teeth in the tooth rows with respect to each other. At least another disadvantageous or undesirable feature of this past core sizing scheme is believed to be that only a portion of the outer circumferential surface of the core was sized. And still another disadvantageous or undesirable feature of this past core sizing scheme is believed to be that the yoke section of such past core may have deflected axially in response to the sizing engagement of the sizing arbor with the bore of such past core resulting in core laminations having a generally curved geometry and not usable for farther manufacturing.

With respect to the past edgewise wound cores, one of the problems encountered during the fabrication of such edgewise wound cores involved "spring-back" of a lanced strip of ferromagnetic material edgewise wound into a plurality of helical convolutions arranged in an annular stack thereby to comprise the edgewise wound core. For instance, the lanced strip was edgewise deformed through a predetermined radius into the helical convolutions thereof defining the core; however, in response to such edgewise deformation, the helical convolutions tended to "spring-back", i.e., tended to assume a greater radius than the predetermined radius through which the lanced strip was edgewise deformed into such helical convolutions thereof. To further complicate the above discussed "spring-back" problem, lanced strips from different stock rolls of the ferromagnetic material are believed to have exhibited different degrees of "spring-back"; therefore, each time lanced strips from such different stock rolls were formed into edgewise wound cores, it is believed that the winding apparatus therefor was shut down and set up, i.e., readjusted, to predeterminately control the different "spring-back" of such lanced strips from such different stock rolls thereof. Thus, it would be desirable to, in effect, be able to ignore the "spring-back" characteristics of the various lanced strips upon the edgewise winding thereof into edgewise wound cores, and then size both the inner and outer circumferential surfaces of such core to preselected diameters therefor.

SUMMARY OF THE INVENTION

Among the several objects of the present invention may be noted the provision of improved methods of predeterminately sizing a core, which at least in part overcome the above discussed disadvantageous or undesirable features, as well as others, of the prior art; the provision of such improved methods in which an outer circumferential surface and a plurality of tooth tip rows comprising an inner circumferential surface of the core aligned between a pair of opposite end faces thereof are sized in their entireties to preselected diameters therefor, respectively; the provision of such improved methods in which the outer circumferential surface and tooth tip rows are deformed generally in opposite radial directions with respect to the core so as to be predeterminately sized with the preselected diameters therefor; the provision of such improved methods in which an external force is exerted on at least one of the opposite faces of the core at least generally adjacent the outer circumferential surface thereof to effect the aforementioned generally radial deformation of the outer circumferential surface and the tooth rows of the core; the provision of such improved methods wherein a lanced strip of ferromagnetic material is edgewise wound into a plurality of helical convolutions comprising the core with the helical convolutions each having a tapered edge part defining the outer circumferential surface on the core and wherein at least some of the tapered edge parts are deformed generally axially across the core thereby to abut together axially adjacent ones of the tapered edge parts, respectively; the provision of such improved methods in which the aforementioned external force imparted to the core is distributed therein so that each helical convolution of the core is subjected to the same force; the provision of such improved methods in which the abutment of the tapered parts on the helical convolutions of the core is effective to provide a greater core density; the provision of such improved methods in which the aforementioned external force is exerted on only the tapered edge part of one of the helical convolutions at the at least one opposite end face of the core; and the provision of such improved methods in which the components utilized therein are simple in design, easily assembled and economically manufactured. These as well as other objects and advantageous features of the present invention will be in part apparent and in part pointed out hereinafter.

In general, a method in one form of the invention is provided for predeterminately sizing an inner circumferential surface and an outer circumferential surface of a core having a pair of generally opposite end faces respectively interposed between the inner and outer circumferential surfaces and with a plurality of tooth tip rows on the core comprising the inner circumferential surface thereof. In practicing this method, only a circumferential section of the core defined between the opposite end faces at least generally adjacent the outer circumferential surface is compressed generally axially across the core. The circumferential surface and the tooth tip rows of the core are displaced generally radially thereof in response to the compression of only the circumferential section of the core, and the generally radial displacement of the outer circumferential surface and the tooth tip rows is positively limited thereby to effect the predetermined sizing of the inner and outer circumferential surfaces, respectively.

Still further in general and in one form of the invention, a method is provided for predeterminately sizing a core. A lamination stack of generally thin ferromagnetic material comprises the core, and the core includes a pair of generally opposite end faces respectively interposed between a pair of generally radially spaced apart circumferential surfaces of the core, respectively. The apparatus includes a pair of opposed die means for relative movement, and a plurality of sizing means for disposition generally in concentric relation with each other, respectively. In the practice of this method, at least a part of the opposed die means is associated with the opposite faces of the core, and the sizing means are disposed in the generally concentric relation thereof in predetermined spaced apart relation with the circumferential surfaces of the core, respectively. The relative movement of the opposed die means is effected, and in response thereto, only a circumferential portion of the core at least generally adjacent one of the circumferential surfaces is compressed generally axially across the core between the opposed die means in the association thereof with the opposite end faces of the core, respectively. Upon this compression of the core, the circumferential surfaces are expanded generally in radially opposite directions with respect to the core into sizing engagement with the sizing means thereby to predeterminately size the circumferential surfaces of the core, respectively.

BRIEF DESCRIPTION OF THE DRAWINGS

FIG. 9 is an enlarged partial view taken from FIG. 8 and illustrating the predetermined spaced apart relation of the sizing means with an inner circumferential surface and an outer circumferential surface of the core prior to the sizing thereof;

FIG. 10 is generally the same as FIG. 9 but showing the sizing engagement of the circumferential surfaces of the core with the sizing means;

FIGS. 11, 12, 13 and 14 are enlarged partial sectional views showing the progressive deformation and abutment together of a tapered edge portion on a plurality of helical convolutions of the edgewise wound lanced strip between the opposed die means thereby to form an edgewise wound core and illustrating principles which may be practiced in a method of sizing a core in one form of the invention, respectively;

Corresponding reference characters refer to corresponding parts throughout the several views of the drawings.

Figure 1:
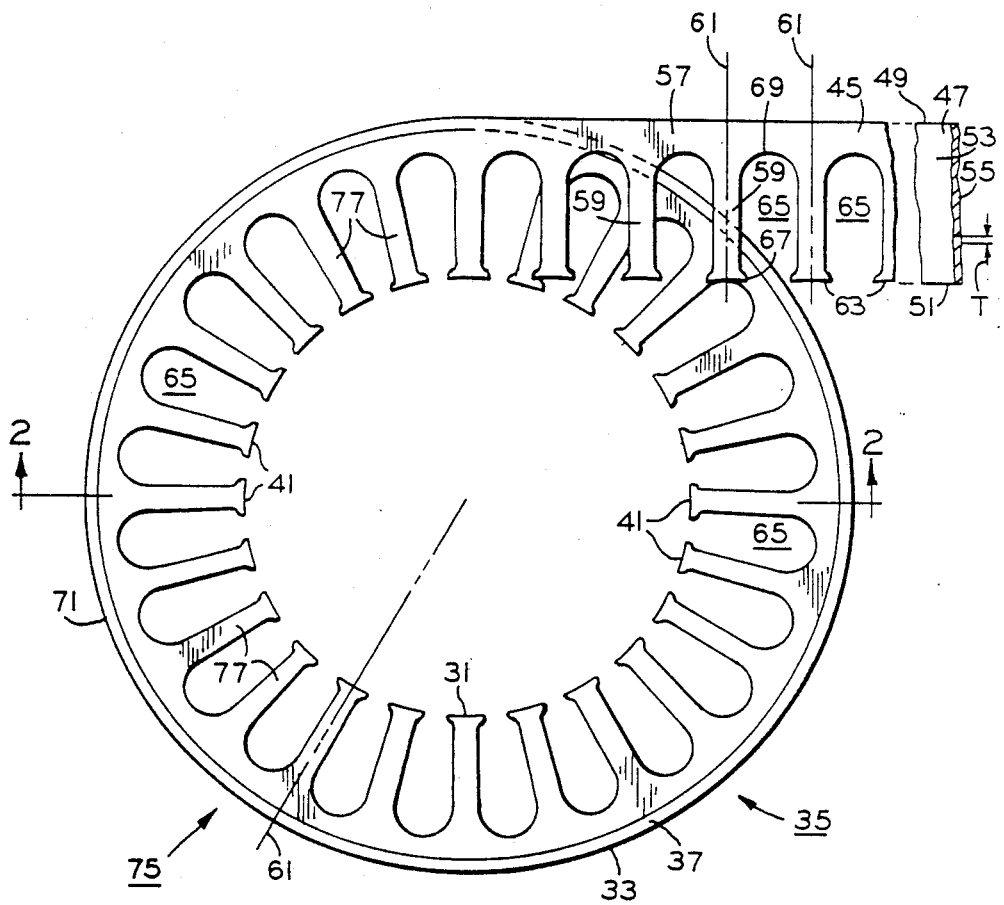
FIG. 1 is a plan view illustrating the edgewise winding of a lanced strip of generally thin ferromagnetic material into an edgewise wound core and with the component parts of the lanced strip aligned generally axially across the core.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

With reference now to the drawings in general, there is shown a method in one form of the invention for predeterminately sizing an inner circumferential surface 31 and an outer circumferential surface 33 of a core 35 having a pair of generally opposite end faces 37, 39 respectively interposed between the inner and outer circumferential surfaces and wit a plurality of tooth tip rows 41 on the core comprising at least in part the inner circumferential surface thereof (FIGS. 1–19). In practicing this method, only a circumferential or annular section or portion 43 of core 35 is compressed generally axially thereacross, and the circumferential section is defined between opposite end faces 37, 39 of the core at least generally adjacent outer circumferential surface 33 thereof (FIGS. 11–14). Outer circumferential surface 33 and tooth tip rows 41 of core 35 are displaced, expanded or otherwise deformed in generally radially opposite directions with respect to the core in response to the compression of only circumferential section 43 of the core, and such radial displacement of the outer circumferential surface and the tooth tip rows is positively limited or contained thereby to effect the predetermined sizing of inner and outer circumferential surfaces 31, 33' respectively (FIGS. 9 and 10).

Figure 2:
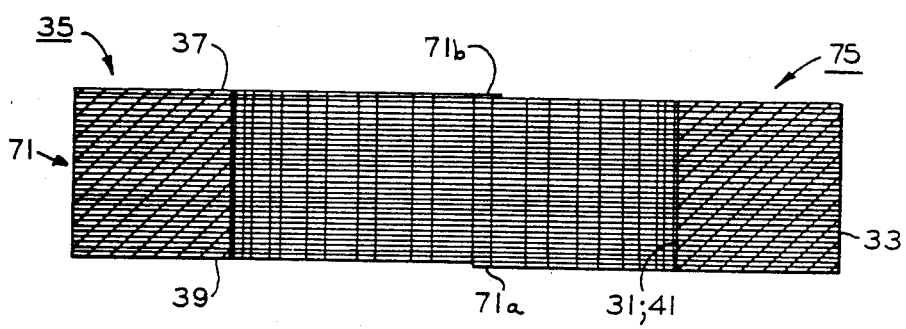
FIG. 2 is a sectional view taken along line 2—2 in FIG. 1.

More particularly and with specific reference to FIGS. 1 and 2, a strip 45 may be lanced or otherwise formed from a strip stock 47 of generally thin ferromagnetic material by suitable means well known to the art, such as a progressive die set or the like for instance (not shown), and the strip stock has, of course, the desired electrical and magnetic characteristics and the desired physical properties to enhance the edgewise winding of the lanced strip into core 35, as discussed in greater detail hereinafter. If a more detailed discussion is desired with respect to the lancing of strip stock 47 and/or a multiple or progressive die set to effect such lancing, reference may be had to the aforementioned Harold L. Fritzsche application Ser. No. 660,211. A pair of generally opposite edges 49, 51 are interposed between a pair of generally flat opposite surfaces or faces 53, 55 on strip 45 so as to extend generally along the length thereof, and the strip is provided with a generally constant thickness T along the length of the strip between the opposite faces thereof. When strip stock 47 is formed or lanced into strip 45, a yoke 57 extends generally lengthwise thereof along or at least generally adjacent opposite edge 49 of the strip. A plurality of teeth 59 on strip 45 extend on a plurality of preselected pitch axes 61 generally laterally from yoke 57 toward opposite edge 51 of the strip, and a plurality of tips or tip sections 63 define free ends on the teeth at least generally adjacent opposite edge 51 of the strip. A plurality of slots 65 intersecting with opposite faces 53, 55 of strip 45 are provided between adjacent ones of teeth 59, and the slots each have an open end or end portion 67 intersecting with opposite edge 51 of the strip between adjacent ones of the tooth tips and a close end or end portion 69 generally adjacent yoke 57 opposite the open end. While strip 45, its yoke 57, teeth 59, and slots 65 are illustrated herein for the purpose of disclosure, it is contemplated that other strips having yokes, teeth and slots of various different configurations may be utilized within the scope of the invention so as to meet at least some of the objects thereof.

To fabricate edgewise wound core 35 from strip 45, the strip is generally edgewise deformed or bent into a plurality of generally helical convolutions 71 thereof, and during such edgewise deformation of the strip, each opposite edge 49, 51 thereof is formed with a preselected radius. However, subsequent to the edgewise deformation of the strip, "spring back" occurs due to the resilient physical properties of the strip, and the deformed opposite edges on helical convolutions 71 thereby assume another or an as wound radius greater than the aforementioned preselected radius, respectively. In this practice of the sizing method of this invention, if a more detailed discussion of the edgewise deformation of strip 45 into helical convolutions 71 thereof and/or the "spring-back" of the helical convolutions is desired, reference may be had to the aforementioned application Ser. No. 660,211.

Further, when strip 45 is deformed into helical convolutions 71 thereof, a generally tapered section or part 73 is formed or deformed along opposite edge 49 on the helical convolutions, and the tapered edge part has an average thickness t which is less than the original or preselected thickness T of the strip, i.e., less than the thickness T of the strip between the tapered part and the other opposite edge 51 of the strip, as best seen in FIG. 11 and as well known in the art. Of course, the edgewise deformation of strip 45 imparting the aforementioned preselected radius to opposite edges 49, 51 of the strip, causes the strip to stretch along opposite edge 49 thereof thereby to result in the formation of tapered part 73 along opposite edge 49 on helical convolution 71.

Upon the above discussed formation of helical convolutions 71, the helical convolutions are arranged or accumulated in a generally annular and axially extending stack 75 thereof comprising core 35 as best seen in FIGS. 1 and 2. During the accumulation of helical convolutions 71 into stack 75, the component parts on the helical convolutions may be somewhat angularly displaced from each other (not shown); however, such component parts are readily and easily adjusted or repositioned with respect to each other thereby to effect the alignment of such component parts generally axially across the stack between opposite end faces 37, 39 thereon, respectively, as discussed in detail hereinafter.

It is contemplated that the component parts on helical convolutions 71 may be aligned to extend generally axially between opposite end face 37, 39 of stack 75 either during or subsequent to the accumulation of the helical convolutions into the stack thereof within the scope of the invention so as to meet at least some of the objects thereof. Thus, when helical convolutions 71 are accumulated with the components parts thereof readjusted in aligned relation across stack 75, yoke 57 on the helical convolutions extends generally axially across the stack between opposite end faces 37, 39 thereby to define a yoke section of the stack, and tapered section 73 on each helical convolution is disposed so as to extend generally axially across the stack between the opposite end faces thereby to define outer circumferential surface 33 of the stack, as best seen in FIGS. 11–14. Further, teeth 59 are aligned generally in a plurality of rows or row formations 77 thereof generally axially across stack 75 between opposite end faces 37, 39, and the tooth rows extend on pitch axes 61 thereof generally radially inwardly from the yoke section of the stack with tooth tip rows 41 defining in part inner circumferential surface 31 of the stack. Of course, tapered parts 73 on helical convolutions 71 in stack 75 comprise the aforementioned circumferential section 43. Upon the edgewise winding of core 35, outer circumference 33 which defines the outside diameter of the core is slightly smaller than the final or predetermined sized diameter thereof, and tooth tip rows 44 which define in part the inside diameter of the core is slightly larger than the final or predetermined sized diameter thereof, as further discussed hereinafter.

To effect the sizing of stack 75, only tapered part 73 on leading helical convolution 71a in stack 75 is supported, as best seen in FIGS. 11–14, and an external force F is exerted or applied against only the tapered part of trailing helical convolution 71b at opposite end face 37 of the stack. Upon the exertion of force F only on tapered part 73 of trailing helical convolution 71b, it may be noted that tapered parts 73 on at least some of helical convolutions 71 are successively deformed generally axially across the core with such successive deformation progressing from the tapered parts on leading and trailing helical convolutions 71a, 71b generally axially inwardly of the stack. In response to this axial deformation, it may also be noted that axially adjacent ones of tapered parts 73 on axially adjacent ones of helical convolutions 71 in stack 75 are abutted together in engagement generally axially across the stack, and upon the abutment of the axially adjacent tapered parts, it may be further noted that only the abutted together tapered parts on the helical convolutions are compressed together in response to the exertion of force F on only the tapered part of trailing helical convolution 71b when only the tapered part of leading helical convolution 71a is supported. Of course, in the event there is an odd or uneven number of helical convolutions 71 in stack 75, an intermediate helical convolution 71c is generally equidistantly axially spaced between leading and trailing helical convolutions 71a, 71b, and tapered part 73 on intermediate helical convolution 71c will remain generally axially undeformed; however, the tapered parts on the helical convolutions axially adjacent the intermediate helical convolution will be deformed into engagement with the undeformed tapered part on the intermediate helical convolution. Upon the aforementioned axial deformation of tapered parts 73 into abutment, it may be noted that when only tapered parts 73 of helical convolutions 71 in stack 75 are compressed together in response to force F, as discussed above, a pair of generally opposite annular beveled surfaces 79, 81 are defined on the tapered parts of leading and trailing helical convolutions 71a, 71b at opposite end faces 37, 39 of the stack at least generally adjacent outer circumferential surface 33 thereof. While force F is discussed herein as effecting the deformation and compression of only tapered parts 73 of helical convolutions 71 in stack 75 when only the tapered part of leading helical convolution 71 is supported for purposes of disclosure, it is contemplated that generally equal and opposite forces may be applied against only the tapered parts of leading and trailing helical convolutions 71a, 71b thereby to effect the compression together of only the tapered parts of the helical convolutions generally axially across the stack within the scope of the invention so as to meet at least some of the objects thereof.

Upon the compression of the axially abutted together tapered parts 73 on helical convolutions 71 of stack 75, it may be noted that the magnitude of force F is at least great enough to effect a plastic flow beyond the elastic limits of the ferromagnetic material only in yoke 57 of each helical convolution in the stack. Thus, the force F is distributed at least generally equally in each helical convolution 71 of stack 75, and the aforementioned plastic flow only in yoke 57 of the helical convolutions is effective not only to predeterminately size core 35 but also to compensate for the "spring-back" occasioned when the core is wound, as further discussed hereinafter. At least upon the compression of circumferential section 43 in stack 75 by force F, a containment force Fc is also applied across the opposite end faces 37, 39 of the stack on at least tooth rows 77. It may also be noted that the magnitude of containment force is preferably great enough to prevent the buckling of teeth 59, i.e., the spreading apart thereof in the axial direction across stack 75, but not great enough to effect deleterious radial or angular displacement of the teeth from tooth rows 77 thereof toward slots 65 or axial compression of the stack at the tooth rows in the same manner as previously mentioned with respect to the axial compression of circumferential section 43 of the stack by force F.

In response to the above discussed plastic flow of ferromagnetic material in only yoke 57 of the helical convolutions 71 upon the compression generally axially across stack 75 of only the abutted together tapered parts 73 on the helical convolutions, it may be noted that outer circumferential surface 33 and tooth tip rows 41 on the stack are displaced or expanded generally in radially opposite directions with respect to the stack, and the generally radially opposite displacement of the outer circumferential surface and the tooth tip rows are positively and predeterminately limited or contained thereby to effect the predetermined sizing of both inner and outer circumferential surfaces 31, 33 of the stack, respectively, as best seen in FIGS. 9 and 10. Thus, it may also be noted that the aforementioned "spring-back" of helical convolutions 71 effected upon the edgewise winding of strip 45 may be compensated by the aforementioned plastic flow only in yoke 57 of the helical convolutions resulting in the generally radial opposite displacement of inner and outer circumferential surfaces 31, 33 to effect the sizing thereof, respectively. Additionally, it may be noted that the compression or abutting together of tapered parts 73 in core 35 is effective to provide a greater core density. Furthermore, albeit not shown for purposes of brevity of disclosure and drawing simplification, it is contemplated that a stack of individual laminations arranged generally in surface-to-surface engagement may have only a circumferential section thereof compressed together thereby to effect the radially opposite displacement and sizing of inner and outer circumferential surfaces on the lamination stack generally in the same manner as discussed hereinabove with respect to helical convolution stack 75 within the scope of the invention so as to meet at least some of the objects thereof.

An alternative core sizing method in one form of the invention is illustrated in FIGS. 15-18 with the alternative method having generally the same method steps and utilizing generally the same component parts as disclosed hereinabove with respect to the previously described core sizing method, and while the alternative core sizing method meets at least some of the objects set out above, it is believed that the alternative core sizing method has indigenous objects and advantageous features which will be in part apparent and in part pointed out in the following discussion.

In practicing this alternative core sizing method, leading helical convolution 71a in stack 75 is supported with the exception of tapered part 73 on the leading helical convolution which is unsupported. Force F is exerted against only tapered part 73 on trailing helical convolution 71b in stack 75, and in response thereto, it may be noted that only the tapered parts of the helical convolutions are successively deformed generally axially across the stack with such successive deformation progressing from the tapered part on the trailing helical convolution toward the tapered part on leading helical convolution 71a. Thus, upon the successive deformations generally axially across stack 75 of only tapered parts 73 on helical convolutions 71, it may be noted that axially adjacent ones of the tapered parts are deformed so as to abut in engagement with each other, and upon the deformation of the tapered part on leading helical convolution 71a, the entire leading helical convolution becomes supported. With the entire leading helical convolution 71a so supported, force F acting on only tapered part 73 on trailing helical convolution 71b in stack 75 serves to compress the abutted together tapered parts on helical convolutions 71 thereby to effect the previously mentioned plastic flow in only yoke 57 thereof and the resulting generally radially opposite displacements of outer circumferential surface 33 and tooth tip rows 41 of the stack. This radially opposite displacement of outer circumferential surface 33 and tooth tip rows 41 is positively or predeterminately limited or contained thereby to effect the predetermined sizing of both inner and outer circumferential surfaces 31, 33 on stack 75. To complete the description of the alternative core sizing method, it may be noted that only beveled surface 79 is formed on deformed tapered part on trailing helical convolution 71b in stack 75 at opposite end face 37 thereof, and the deformed tapered part on leading helical convolution 71a provides opposite end face 39 of the stack with a generally planar configuration.

Figure 19:
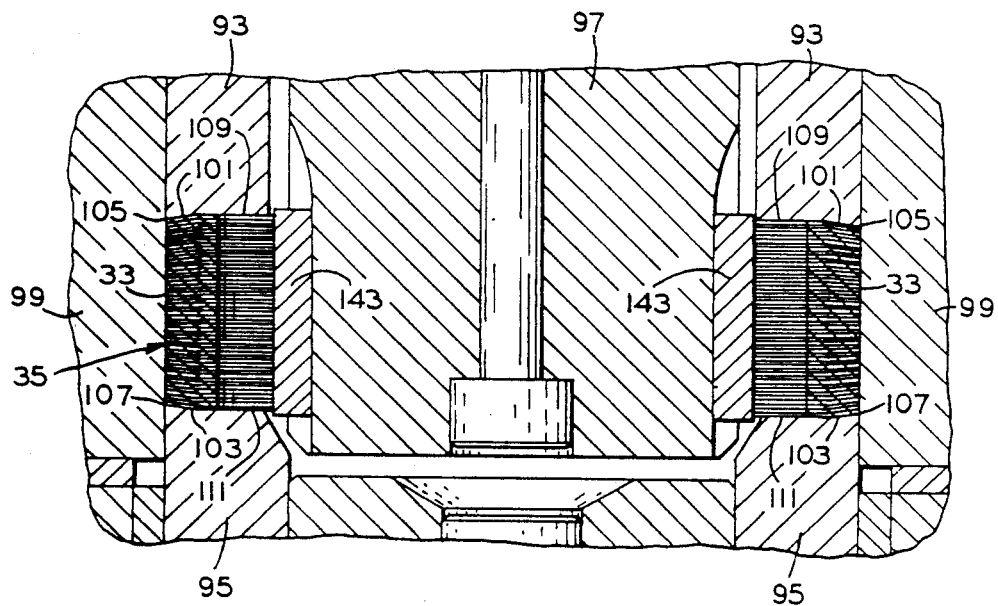
FIG. 19 shows the core of FIGS. 11–14 associated with the die means and sizing means upon the sizing of the core.

Referring again to the drawings in general and recapitulating at least in part with respect to the foregoing, edgewise wound core 35 is provided with lanced strip 45 having opposite edges 49, 51 and edgewise wound into helical convolutions 71 arranged in stack 75 thereof. (FIGS. 1, 2 and 19). Stack 75 includes opposite end faces 37, 39 defined by leading and trailing helical convolutions 71a, 71b, and tapered part 73 is provided at least generally adjacent opposite edge 49 on each of helical convolutions 71 in the stack (FIGS. 2 and 11-14). Tapered parts 73 on at least some of helical convolutions 71 are deformed generally axially across stack 75 between opposite end faces 37, 39 thereof so as to at least in part abut together the tapered parts on axially adjacent ones of the helical convolutions in the stack, and the abutted together tapered parts comprise outer circumferential surface 33 on the stack interposed between opposite end faces 37, 39 thereof, respectively (FIG. 19).

A method in one form of the invention is provided for predeterminately sizing core 35 (FIGS. 3-10). Core 35 includes lanced strip 45 having opposite edges 49, 51 and edgewise wound into helical convolutions 71 arranged in stack 75, and the opposite edges on the helical convolutions define inner and outer circumferential surfaces 31, 33 of the core interposed between opposite end faces 37, 39 thereof with the inner circumferential surface comprising tooth tip rows 41 aligned between the opposite end faces, respectively (FIGS. 1, 2 and 19). Apparatus 91 includes a pair of generally opposed dies or die means 93, 95 operable generally for relative movement, and a plurality of sizing means, such as a sizing arbor 97 and a set of sector or sizing jaws 99 or the like for instance, operable generally for disposition in generally concentric spaced apart relation, respectively (FIGS. 5-10). In the practice of this method, sizing arbor and jaws 97, 99 are operated, and thereby the disposition of the sizing arbor and jaws in predetermined radially spaced apart relation with outer circumferential surface 33 and tooth tip rows 41 of core 35 is effected (FIGS. 5-10). Opposed dies 93, 95 are operated, and only circumferential section 43 of core 35 is compressed at least generally axially between the dies (FIGS. 5-7 and 11-14). In response to the compression of only circumferential section 43 of core 35, outer circumferential surface 33 and tooth tip rows 41 of the core are displaced into sizing engagement with sizing arbor and jaws 97, 99, and thereby both inner and outer circumferential surfaces 31, 33 of the core are predeterminately sized, respectively (FIGS. 9-12).

More particularly and with specific reference to FIGS. 7-16, opposed dies 93, 95 include a pair of opposed and generally annular beveled die surfaces 101, 103 with a pair of generally circular leading edges 105, 107 on the beveled die surfaces, respectively, as best seen in FIG. 11. To initiate the operation of apparatus 91, stack 75 of helical convolutions 71 is arranged or associated in a preselected located position on die 95, and in such preselected located position, tapered part 73 on leading helical convolution 71a at least generally adjacent outer circumferential surface 33 of the stack is placed in engagement with leading edge 107 of beveled die surface 103 on die 95. With stack 75 in its preselected located position on die 95, die 93 is moved relative to die 95, and upon such relative movement, leading edge 105 of beveled die surface 101 on die 93 is engaged with tapered part 73 on trailing helical convolution 71b at least generally adjacent outer circumferential surface 33 of the stack. Thus, stack 75 is contained in its preselected located position between opposed dies 93, 95, and it may be noted that beveled die surfaces 101, 103 on the opposed dies are disposed generally in overlaying relation with tapered parts 73 of leading and trailing helical convolutions 71a, 71b in stack 75, respectively.

Figure 6:
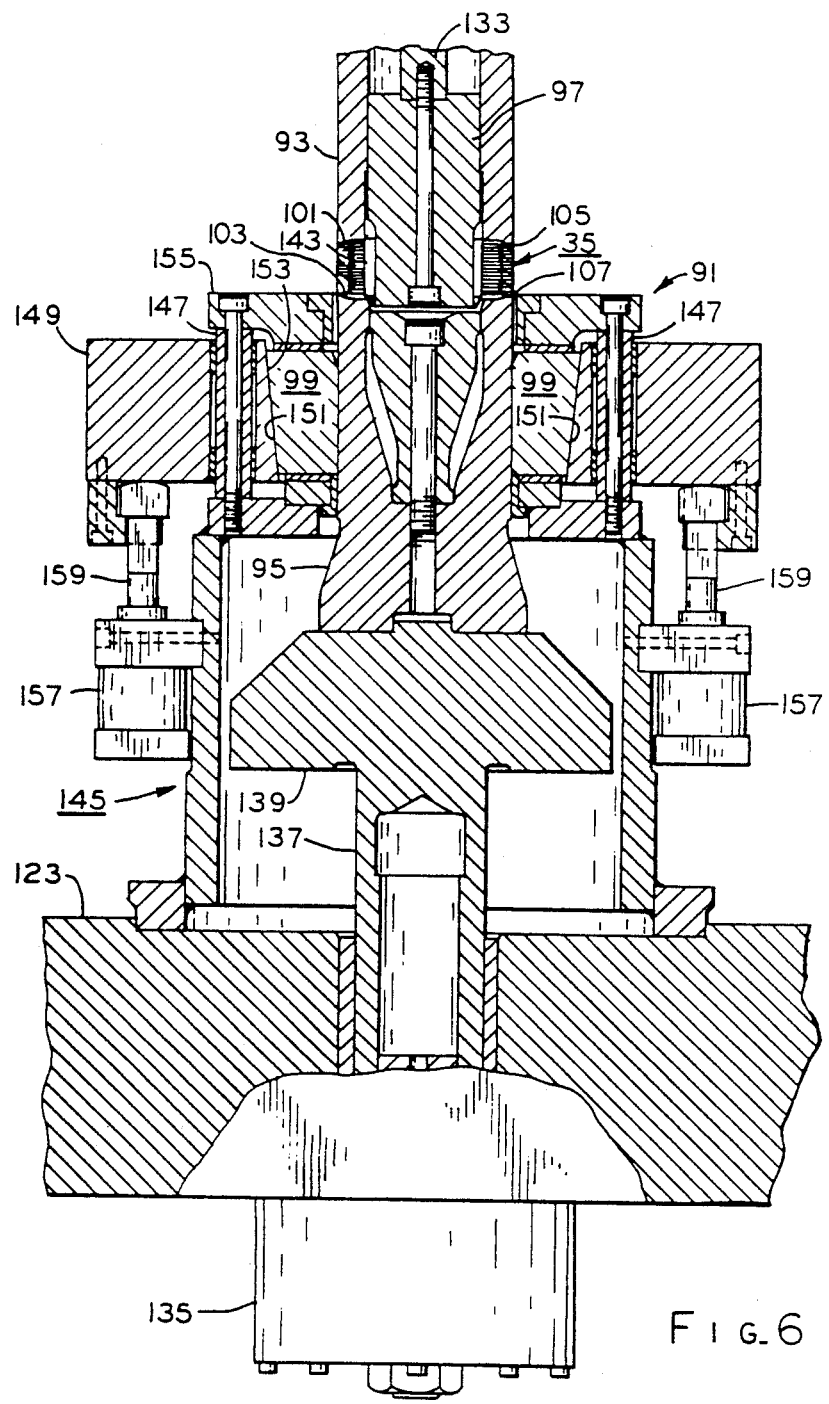
Figure 7:
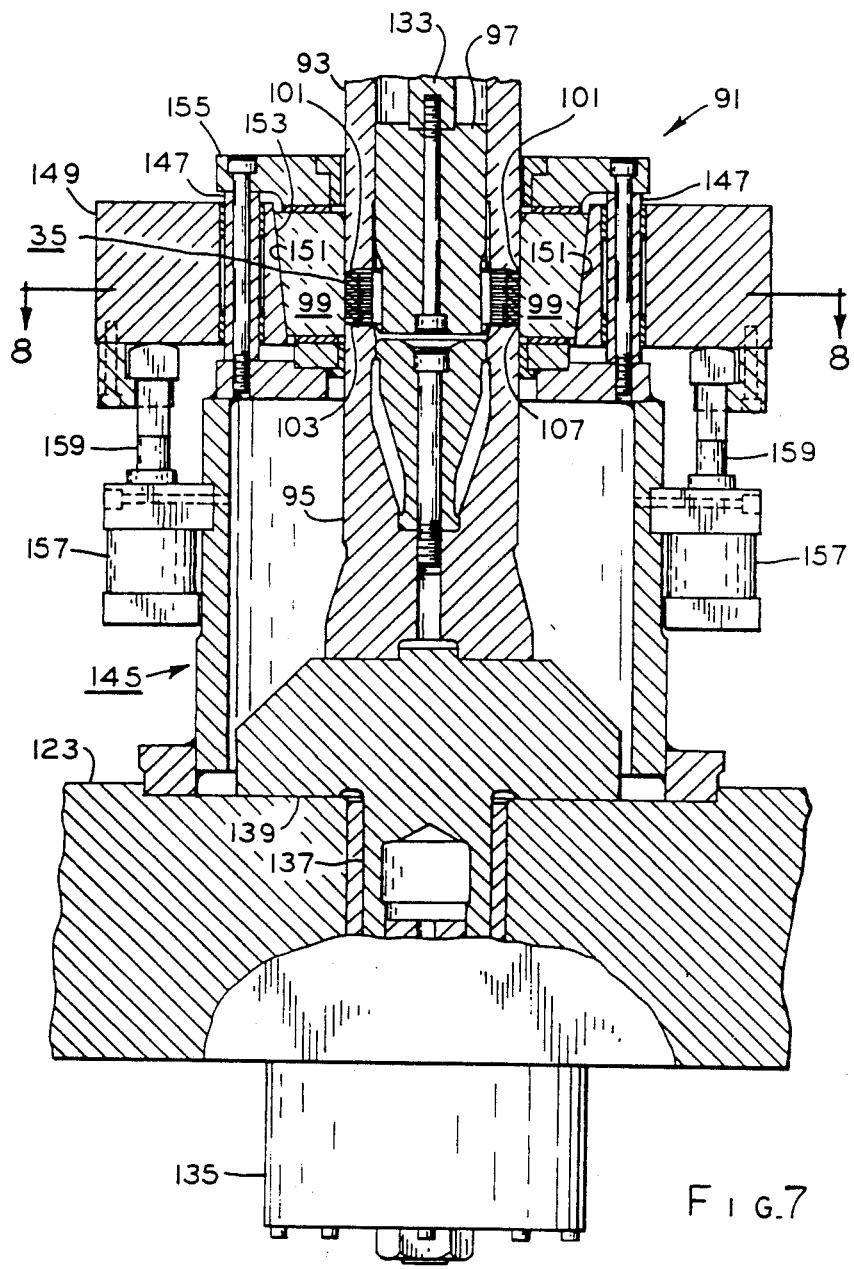

Sizing arbor 97 has the configuration of a generally elongate cylindric rod having a diameter preselected to define the predetermined size or diameter for inner circumferential surface 31 of stack 75. Therefore, at least upon the above discussed containment of stack 75 in its preselected located position between dies 93, 95, arbor 97 is moved into association with the stack, and thereby the arbor is positioned generally in predetermined spaced apart relation, i.e., a predetermined radial distance D, from tooth tip rows 41 of the stack, respectively, as best seen in FIGS. 6 and 9. Thereafter, arbor 97 and opposed dies 93, 95 with stack 75 contained therebetween are conjointly moved toward a position seating die 95 against further movement, and during such conjoint movement, the containment of the stack in its preselected located position between the dies and also the predetermined spaced apart relation of the arbor with tooth tip rows 41 of the stack are maintained, respectively, as best seen in FIGS. 7 and 9.

Figure 5:
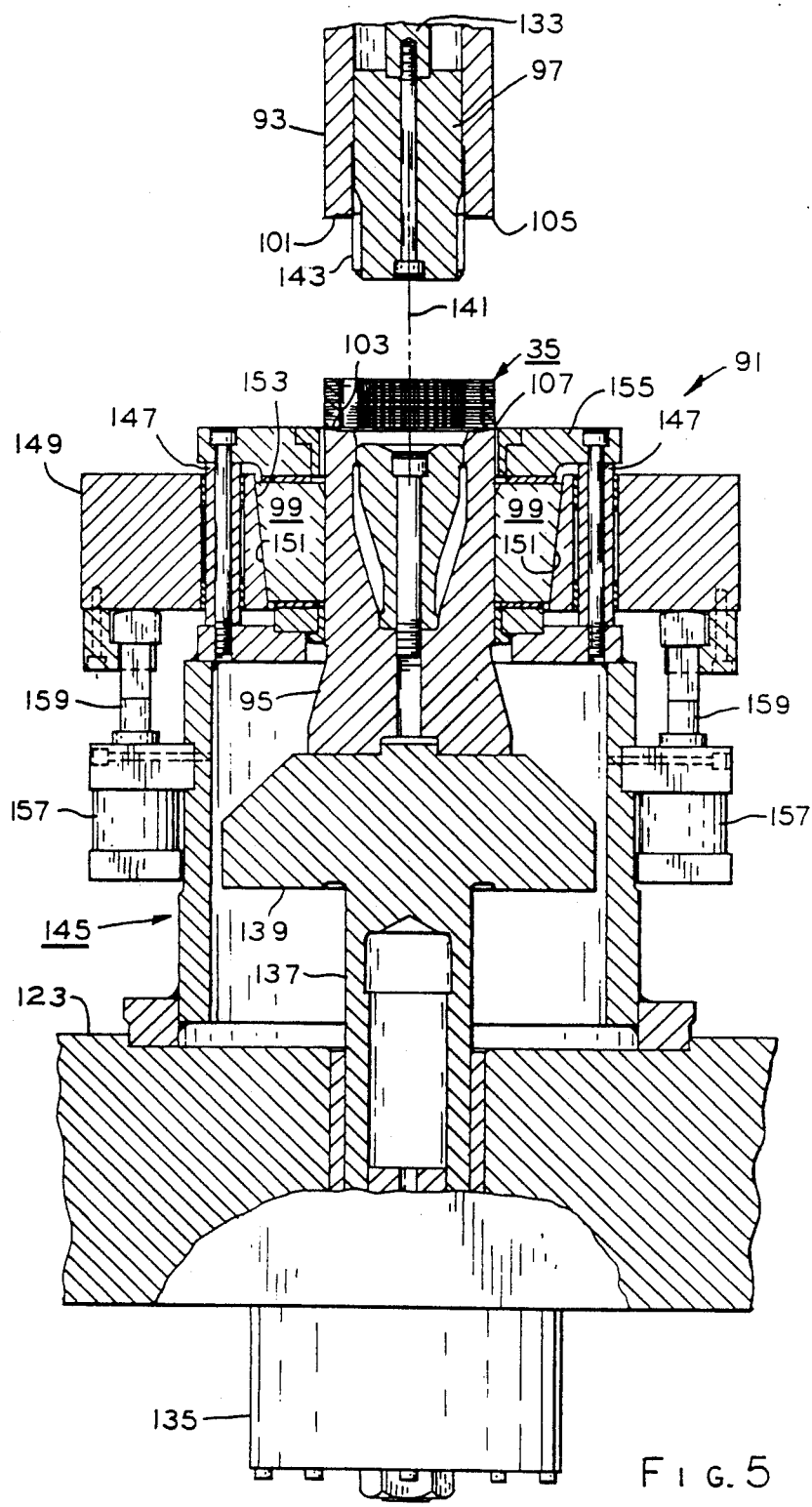
FIGS. 5, 6 and 7 are enlarged partial sectional views of the apparatus of FIG. 3 illustrating various positions of a pair of opposed die means and a plurality of sizing means of the apparatus for sizing the core, respectively.
Figure 8:
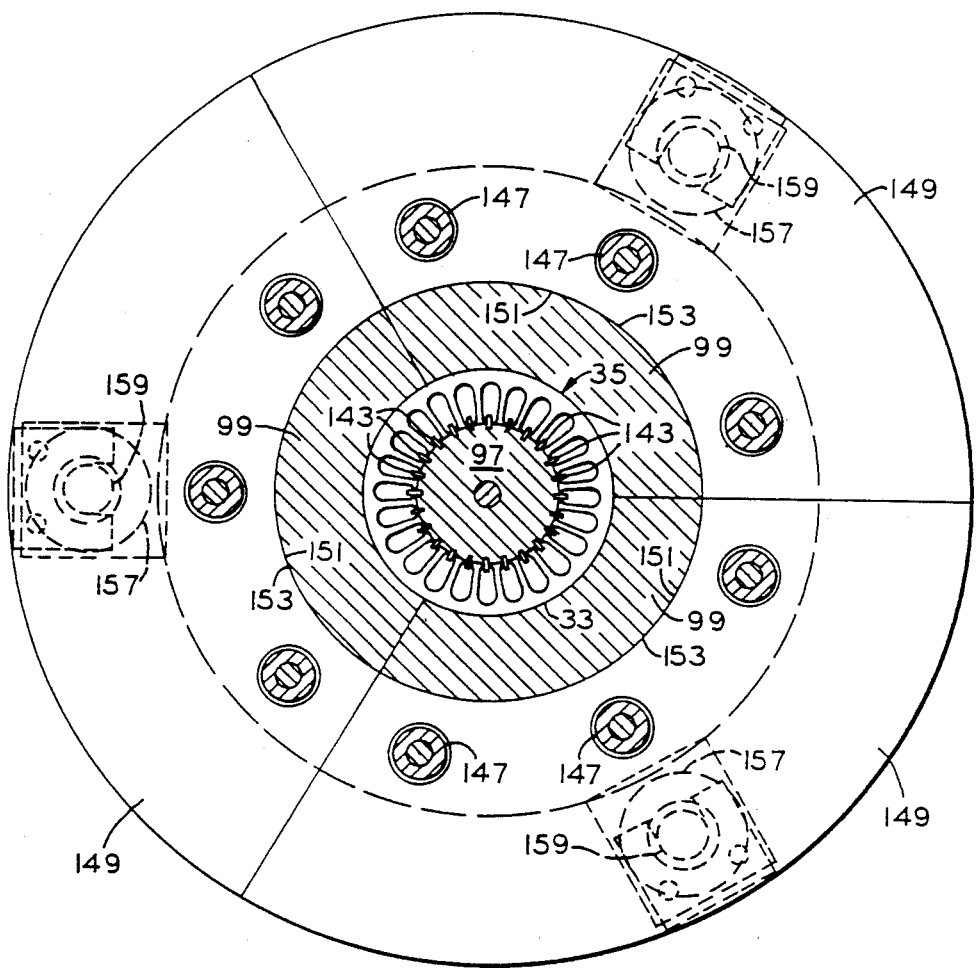
FIG. 8 is a sectional view taken along lne 8—8 in FIG. 7.
Figure 13:
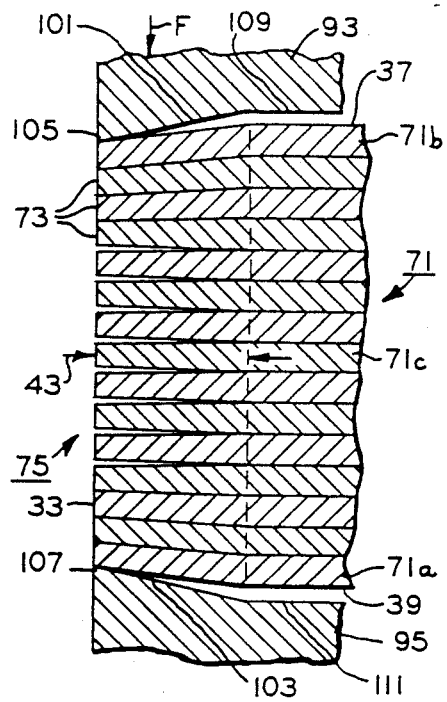
Figure 14:
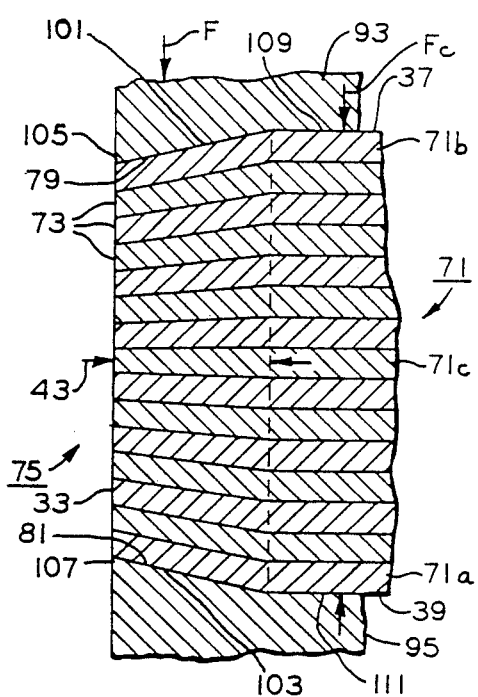
Figure 15:
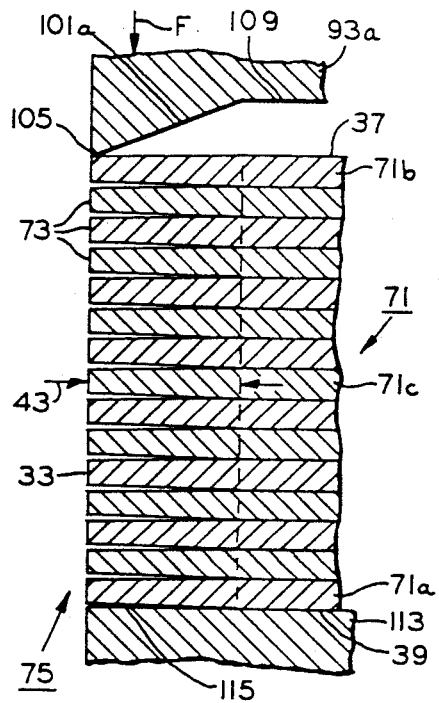
FIGS. 15, 16, 17 and 18 are generally the same as FIGS. 11–14 showing the formation of an alternative core and illustrating principles which may be practiced in an alternative method of sizing a core in one form of the invention.
Figure 16:
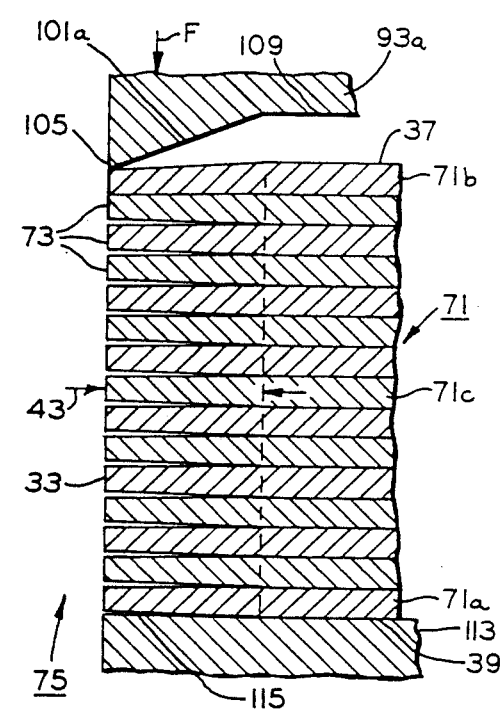
Figure 17:
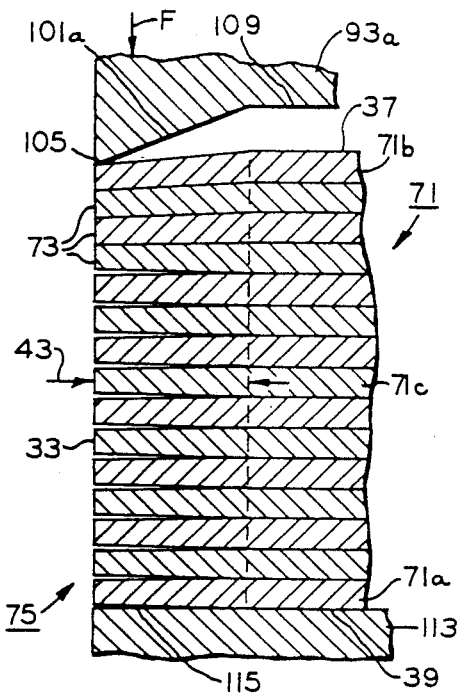
Figure 18:
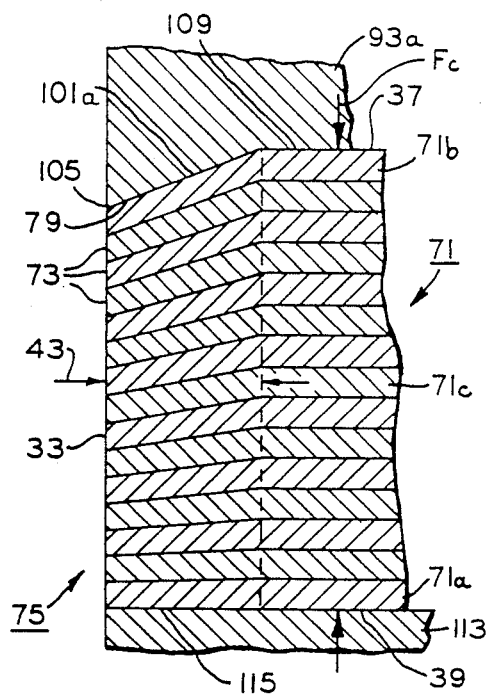

Sizing jaws 99 are movable between open positions, as best seen in FIG. 5 and closed mating positions thereof, as best seen in FIGS. 7-10, respectively. Upon the above discussed conjoint movement of opposed dies 93, 95 and arbor 97 to dispose die 95 in its seated position, jaws 99 are moved or actuated from the open positions toward the closed mating positions thereof, and when in the closed mating positions, the aws are arranged in predetermined spaced apart relation, i.e., a predetermined radial distance R, from outer circumferential surface 33 of stack 77 maintained in its preselected located position between dies 93, 95, as best seen in FIGS. 8 and 9. It may be noted that jaws 99 in the closed mating positions thereof, are concentrically arranged with arbor 97 and have a diameter preselected to define the predetermined size or diameter of outer circumferential surface 33 of stack 75. With jaws 99 in their closed mating positions so as to be predeterminately radially spaced apart from outer circumferential surface 33 of stack 77 in its preselected located position between dies 93, 95, force F is exerted on die 93 thereby to move it relative to arbor 97, jaws 99 and die 95 in its seated position. In response to this force imparted to effect the relative movement of die 93, it may be noted that only beveled die surfaces 101, 103 on dies 93, 95 become engaged with only tapered parts 73 on leading and trailing helical convolutions 71a, 71b in stack 75, and the tapered parts on at least some of helical convolutions 71 are successively deformed generally axially across the stack with such successive deformation progressing from the tapered parts on the leading and trailing helical convolutions generally axially inwardly of the stack, as previously mentioned. In response to this deformation, it may also be noted that axially adjacent ones of tapered parts 73 on axially adjacent ones of helical convolutions 71 in stack 75 are abutted together in engagement with each other generally axially across the stack, and upon the abutment of the axially adjacent tapered parts, force F acting on die 93 thencompresses only the abutted together tapered parts generally axially across the stack only between beveled die surfaces 101, 103 on dies 93, 95 in the manner discussed hereinabove. It may be noted that only beveled dies surfaces 101, 103 on dies 93, 95 engage only tapered parts 73 on leading and trailing helical convolutions 71a, 71b in stack 75 thereby to effect the compression of only circumferential section 43 of the stack. Upon the compression of only circumferential section 43 of stack 75 between beveled die surfaces 101, 103 on dies 93, 95, respectively, it may be noted that generally opposite central surfaces 109, 111 of dies 93, 95 become engaged with opposite end faces 37, 39 of the stack at least generally across tooth rows 77 thereof to effect the exertion of containment force Fc on the tooth rows in the manner discussed hereinabove. Therefore, tooth rows 77 are subjected only to containment force Fc applied by dies 93, 95 thereby to obviate the possibility of angularly displacing teeth 59 from the preselected pitch axes 61 in the tooth rows thereof in the stack, respectively, as previously mentioned.

In response to the compression of only circumferential section 43 generally axially across stack 75 between only beveled die surfaces 101, 103 of dies 93, 95, outer circumferential surface 33 of the stack is expanded or displaced generally radially outwardly thereof into sizing engagement with jaws 99 in their closed mating positions thereby to effect the predetermined sizing of the entire outer circumferential surface, and tooth tip rows 41 of the stack are expanded or displaced generally radially inwardly thereof into sizing engagement with arbor 97 thereby to effect the predetermined sizing of inner circumferential surface 31 of the stack, respectively. As previously discussed, the plastic flow of the ferromagnetic material in only yoke 57 of helical convolutions 71 in stack 75 in response to the exertion thereon of force F effects the radial movement of outer circumferential surface 33 and tooth tip rows 41 of the stack, and it is believed that the radial inward movement of the tooth tip rows into sizing engagement with arbor 97 occurs subsequent to the radially outward movement of the outer circumferential surface into sizing engagement with jaws 99. Albeit not shown for the purposes of drawing simplification and brevity of disclosure, it is contemplated that apparatus 91 may be operated generally in the same manner discussed above to effect the predetermined sizing of the inner and outer circumferential surfaces of a stack of individual laminations arranged generally in surface-to-surface engagement within the scope of the invention so as to meet at least some of the objects thereof. To complete the discussion of the operating method for apparatus 91, it may be noted that the aforementioned "spring-back" of helical convolutions 71 effected upon the edgewise winding of strip 45 may be compensated for by the radial displacement of inner and outer circumferential surfaces 31, 33 into sizing engagement with arbor 97 and jaws 99, respectively, as discussed above. As previously mentioned, when the aforementioned plastic flow of the ferromagnetic material in only yoke 57 of helical convolutions 71 in stack 75 occurs, the yield point of such material is exceeded thereby to establish a new stress/-strain relationship in the stack, and for all practical purposes, the plastic flow eliminates "spring-back" in the stack.

An alternative core sizing method in one form of the invention is illustrated in FIGS. 15-18 with the alternative method having generally the same method steps and utilizing generally the same component parts of the apparatus as discussed hereinabove and while such alternative method meets at least some of the objects set out above, it is believed that such alternative method has indigenous objects and advantageous features which will be in part apparent and in part pointed out in the following discussion.

In the practice of this alternative method other dies 93a, 113 are utilized in the place of dies 93, 95. It may be noted that die 113 is provided with a generally planar die surface 115, and beveled die surface 101a of die 93a has a greater angle than the die surface 101 of die 93.

Thus, when stack 75 is placed in its preselected position on die 113, planar die surface 115 thereof seats or is engaged with leading helical convolution 71a in the stack with the exception of tapered part 73 on the leading helical convolution. When force F is exerted on die 93a with stack 75 contained in its preselected located position between dies 93a, 113, the engagement of only beveled die surface 101a on die 93a with only tapered part 73 on trailing helical convolution 71b in the stack effects the successive deformation of only the tapered parts in the helical convolutions generally axially across the stack with such successive deformation progressing from the tapered part of the trailing helical convolution toward the tapered part of leading helical convolution 71a. Thus, it may be noted that axially adjacent ones of tapered parts 73 on helical convolutions 73 in stack 75 are successively deformed so as to abut in engagement with each other, and upon the deformation of the tapered part on leading helical convolution 71a, the entire leading helical convolution becomes seated on or engaged with planar die surface 115 of die 113. Thereafter, force F acting on die 93a serves to compress only circumferential section 43 of stack 75 generally axially across the stack between beveled die surface 101a and planar die surface 115 thereby to effect the radial displacement of inner and outer circumferential surfaces 31, 33 of the stack into the sizing engagement thereof with arbor 97 and jaws 99, respectively, as previously discussed.

With reference once again to the drawings in general and recapitulating at least in part with respect to the foregoing, apparatus 91 is provided for predeterminately sizing inner and outer circumferential surfaces of core 35 having opposite end faces 37, 39 respectively interposed between the inner and outer circumferential surfaces and with tooth tip rows 41 on the core comprising the inner circumferential surface thereof (FIGS. 1–19). Apparatus 91 has dies 93, 95 arranged generally in opposed relation and operable generally for compressing only circumferential section 43 of core 35, and a plurality of sizing means, i.e., sizing arbor 97 and jaws 99, are operable generally for disposition in confronting and predetermined radially spaced apart relation with outer circumferential surface 33 and tooth tip rows 41 of the core, respectively (FIGS. 5–10). Outer circumferential surface 33 and tooth tip rows 41 of core 35 are displaced generally radially thereof into sizing engagement with arbor and jaws 97, 99 thereby to effect the predetermined sizing of inner and outer circumferential surfaces 31, 33 of the core in response to the compression of only circumferential section 43 of the core by dies 93, 95, respectively (FIGS. 11–14).

Figure 3:
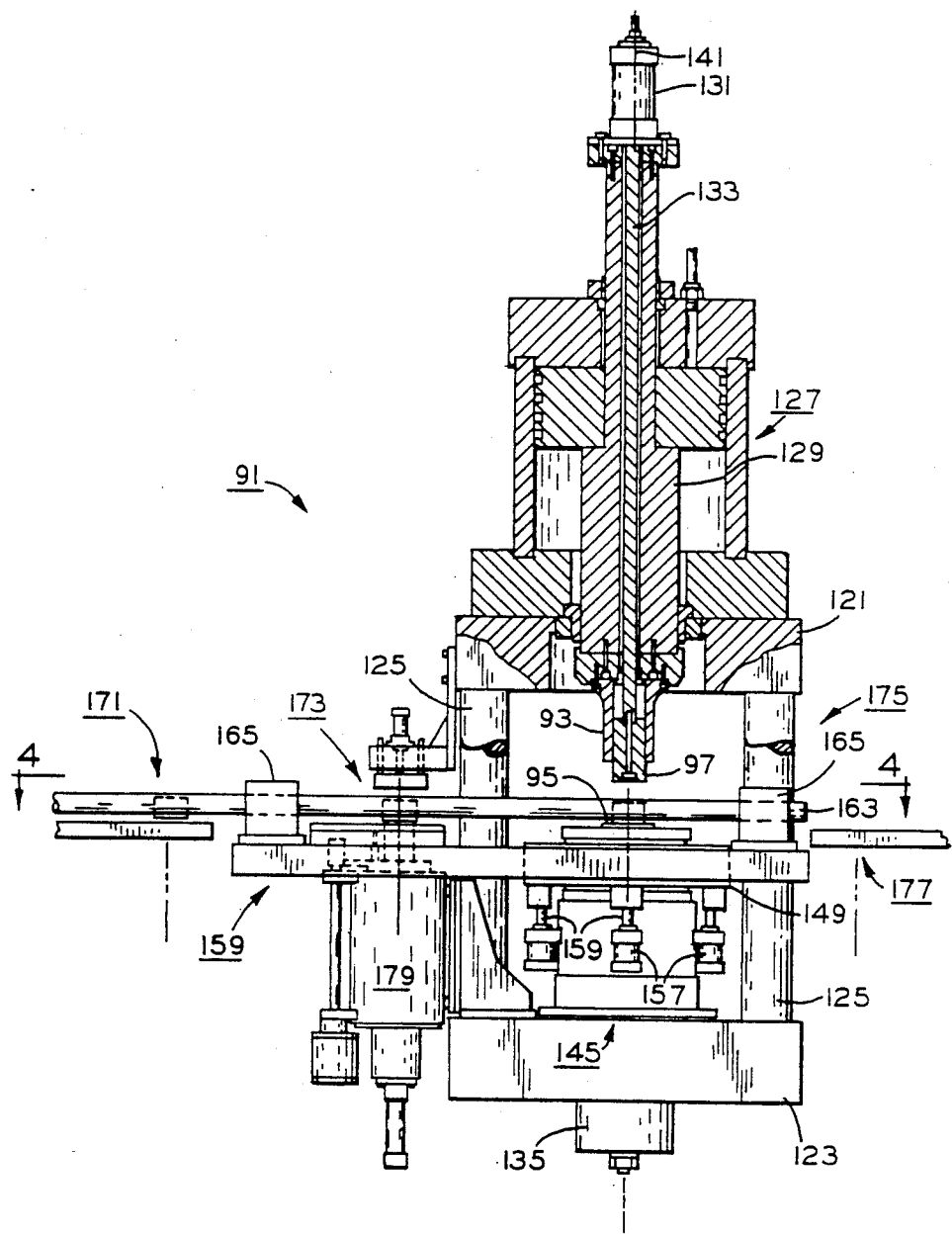
FIG. 3 is a partial front elevational view showing partially in cross-section apparatus for sizing a core and illustrating principles which may be practiced in a method of predeterminately sizing a core, in one form of the invention.

More particularly and with specific reference to FIGS. 3–14 and 19, apparatus 91 is provided with upper and lower plates 121, 123 suitably interconnected by a plurality of dowels or dowel pins 125. Actuating means, such as for instance a servo motor 127 or the like which may be of the double-acting air or hydraulic motor type, is mounted by suitable means to upper plate 121, and servo motor 127 includes a reciprocally movable drive or piston rod 129 which extends generally coaxially through the servo motor, as best seen in FIG. 3. Another actuating means, such as for instance another servo motor 131 or the like which may be of the double-acting air or hydraulic motor type, is secured by suitable means to an upper end of piston rod 129 for conjoint movement therewith, and servo motor 131 includes another reciprocally movable drive or piston rod 133 which extends generally coaxially through piston rod 129. Die 93 is connected by suitable means to the lower end of piston rod 129, so as to be conjointly movable therewith, and arbor 97 which extends generally concentrically through die 93 and its beveled die surface 101 is connected by suitable means to the lower end of piston rod 133 so as to be conjointly movable therewith. Another actuating means, such as for instance a servo motor 135 or the like which may be of the double-acting air or hydraulic motor type, is mounted by suitable means to lower plate 123, and servo motor 135 includes another reciprocally movable drive or piston rod 137 which extends through the lower plate. Die 95 is secured by suitable means to the upper end of piston rod 137 for conjoint movement therewith, and the piston rod includes an abutment means 139 for seating or abutting engagement with lower plate 123, as discussed hereinafter. Piston rods 129, 133, 137 are reciprocally movable on a centerline axis 141 of apparatus 91, and both dies 93, 95 and arbor 97 on the piston rods are generally concentrically arranged about centerline axis 141, respectively. If desired, arbor 97 may be provided with a plurality of means, such as for instance flutes 143 or the like, for locating or guiding relation between adjacent ones of tooth tip rows 41 on core 35, as discussed in greater detail hereinafter, and the flutes extend generally radially outwardly from the arbor, respectively, as best seen in FIGS. 5 and 8–10.

Sizing jaws 99 are also concentrically aligned about centerline axis 141 of apparatus 91, and the jaws are generally reciprocally and radially movable between the open positions and the closed mating positions on a support or support means 145 therefor, as best seen in FIGS. 5–8. Support 145 is secured by suitable means to lower plate 123 so as to extend at least in part generally coaxially about lower die 95 and its piston rod 137, and a plurality of guide means or guide rods 147 are secured to the support generally radially outwardly of sizing jaws 99. Means, such as a plurality of sector cams 149 or the like for instance, are operable generally for camming jaws 99 to effect the movement of the jaws from the open positions toward the closed mating positions thereof, as best seen in FIGS. 5–8. Jaws 99 and cams or camming means 149, respectively include a plurality of mating cam surfaces 151, 153, and the cams are reciprocally and guidably movable on guide rods 147 therefor while the jaws are in part guidably interposed for movement between a plurality of guide plates or guide means 155 therefor which are secured to the guide rods. A plurality of cam actuating means, such as for instance cam operating servo motors 157 which may be the double-acting air or hydraulic motor type, are secured by suitable means to support 145, and the cam operating servo motors include a plurality of reciprocally movable drive or piston rods 159 which are secured by suitable means to cams 149, respectively.

In the operation of apparatus 91 assume that core 35 is placed in its preselected located position on die 95 in an at-rest position thereof, as previously discussed, and that die 93 and arbor 97 are in retracted positions thereof, as best seen in FIGS. 3 and 5. To initiate the operation of apparatus 91, servo motor 127 is actuated to drive its piston rod 129 and move die 93 from its retracted position toward a rrotracted position in engagement with core 35, as best seen in FIG. 6, thereby to contain the core in the preselected located position thereof between dies 93, 95, respectively. With core 35 so contained between dies 93, 95, servo motor 131 is then actuated to drive its piston rod 133 and move arbor 97 from the retracted position toward a protracted position thereof, as best seen in FIG. 6; and, in its protracted position, the arbor is arranged in the previously mentioned predeterminately radially spaced apart relation with tooth tip rows 41 of the core, and flutes 143 on the arbor are interposed between adjacent ones of the tooth tip rows, as best seen in FIG. 9. Thereafter, servo motors 127, 131, 135 are conjointly actuated to drive their piston rods 129, 133, 137 and effect the movement of die 95 from the at-rest position toward a seated position thereof with abutment 139 on piston rod 137 being seated in engagement with lower plate 123, as best seen in FIG. 7, and also to effect conjoint movement with die 95 of both die 93 and arbor 97 toward second protracted positions thereof. Of course, during this conjoint movement of dies 93, 95 and arbor 97, core 35 is maintained in its preselected located position between the dies, and the predetermined radially spaced apart relation is maintained between tooth tips rows 41 of the core and the arbor. Thus, in response to the conjoint movement of die 95 to its seated position and die 93 and arbor 97 to the second protracted positions thereof, outer circumferential surface 33 of core 35 is disposed within sizing jaws 99 in the open positions thereof, as best seen in FIGS. 7 and 9. With core 35 so disposed within sizing jaws 99 in the open positions thereof, cam operating servo motors 157 may be conjointly actuated to drive their piston rods 159 and move cams 149 upwardly on guide rods 147 therefor. This upward movement of cams 149 on guide rods 147 drivingly engages cam surfaces 153 on the cams with cam surfaces 151 on sizing jaws 99 thereby to cam the sizing jaws at least generally radially from the open positions toward the closed mating positions thereof in the previously mentioned predetermined radially spaced relation with outer circumferential surface 33 on core 35, as best seen in FIGS. 8 and 9. When sizing jaws 99 are in the closed mating positions thereof, servo motor 127 is effective to exert force F on die 93 to effect the compression of only circumferential section 43 of core 35 between dies 93, 95 and the resulting displacement of inner and outer circumferential surfaces 31, 33 into sizing engagement with arbor 97 and jaws 99, respectively, as discussed in detail hereinabove and as best seen in FIGS. 10-14.

Figure 4:
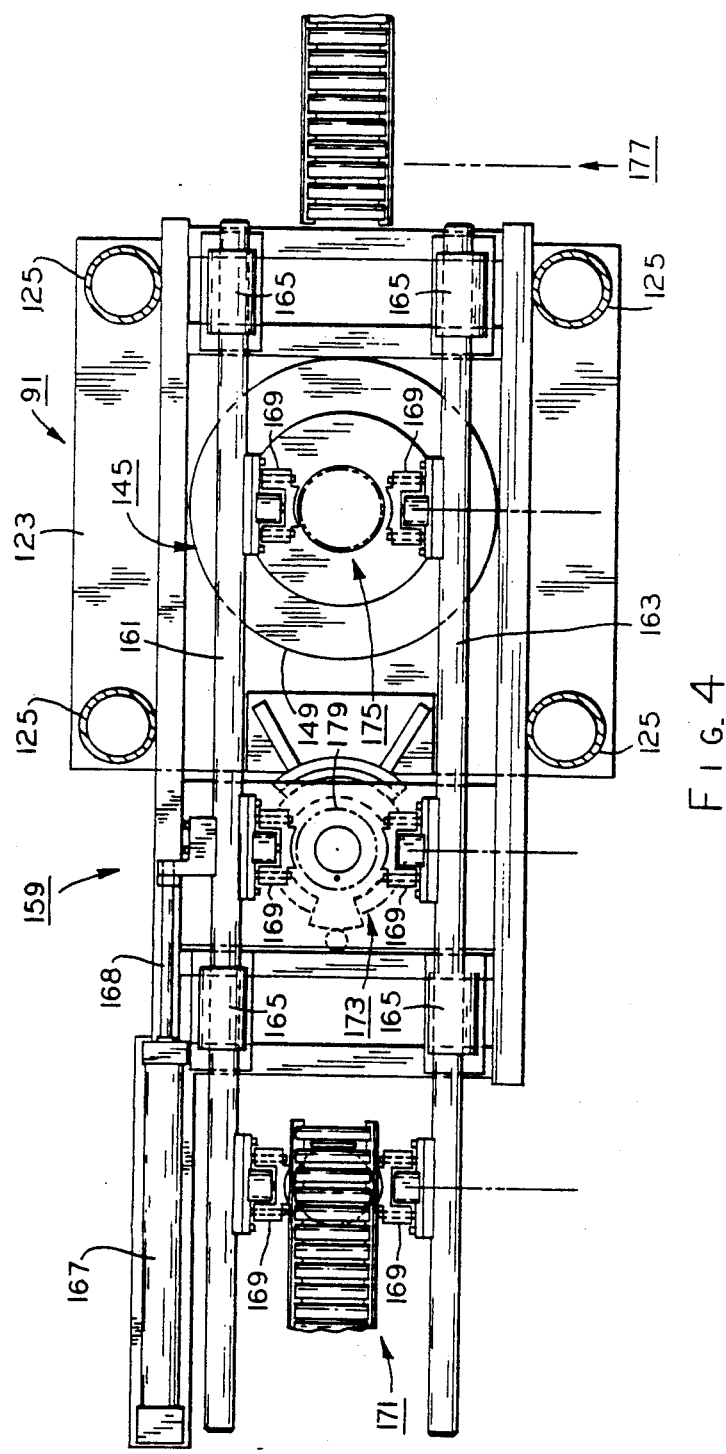
FIG. 4 is a sectional view taken along line 4—4 in FIG. 3.

Albeit not a part of this invention, a core transfer mechanism 159 is mounted by suitable means to apparatus 91, as best seen in FIGS. 3 and 4, and such core transfer mechanism is of a type well known to the art being commercially available from Grotnes Metalforming Systems, Inc., Chicago, Ill. Core transfer mechanism 159 has a pair of spaced interconnected slide rods 161, 163 journaled at 165 for conjoint reciprocal movement, respectively, and another double-acting servo motor 167 has a piston rod 168 secured to slide rod 161 so as to reciprocally drive the slide rods 161, 163. Three sets of opposed core gripping devices 169 of a type well known to the art are spaced apart along slide rods 161, 163 and are conjointly operable to successively deliver cores 35 from a receiving station 171 therefor to a core aligning station 173, a work station 175 at apparatus 91, and an unloading station comprising a conveyor at 177 when slide rods 161, 163 are reciprocally driven upon the selective actuation of servo motor 167. An aligning device 179 is mounted by suitable means to lower plate 123 of apparatus 91 so as to be located at core aligning station 173, and such aligning device is of a type well known to the art being commercially available from Grotnes Metalforming Systems, Inc., Chicago, Ill. When a core 35 in the aforementioned as wound condition thereof is delivered to core aligning station 173 by the operation of core transfer mechanism 159, aligning device 179 is operable to adjust or reposition the helical convolutions in the core thereby to effect the alignment of the component parts of the helical convolutions generally axially across the core between the opposite end faces thereof, as previously mentioned.

From the foregoing, it is now apparent that an improved methods of sizing a core have been presented meeting the objects set out hereinbefore, as well as others, and it is contemplated that changes as to the precise arrangements, shapes, details and connections of the components apparatus, utilized in the practice of such and methods, as well as the precise order of the steps of such methods, may be made by those having ordinary skill in the art without departing from the spirit of the invention or from the scope of the invention as set out in the claims which follow.

What I claim as new and desire to secure by Letters Patent of the United States is:

1. A method of fabricating an edgewise wound core from a lanced strip of generally thin ferromagnetic material having a preselected thickness between a pair of generally opposite edges thereof and with a plurality of predeterminately spaced apart tooth tips defining one of the opposite edges, the method comprising the steps of:

deforming the strip generally edgewise thereof into a plurality of generally helical convolutions and forming thereby a generally tapered part along the other of the opposite edges on the helical convolutions with the thickness of the tapered part being less than the preselected thickness of the strip;

accumulating the helical convolutions in a generally annular and axially extending stack thereof having a pair of generally opposite end faces thereby to comprise the core;

disposing the tapered parts on the helical convolutions so as to define an outer circumferential surface of the core extending generally axially between the opposite end faces thereof and aligning the tooth tips on the helical convolutions generally in a plurality of tooth tip rows extending generally axially between the opposite end faces of the core thereby to define an inner circumferential surface of the core;

supporting at least a part of one of the opposite end faces of the core;

exerting a force against only the tapered part of one of the helical convolutions at the other of the opposite end faces of the core and deforming thereby only the tapered parts on at least some of the helical convolutions generally axially across the core between the opposite end faces thereof, respectively;

compressing together only the tapered parts on the helical convolutions and abutting the tapered parts at least in part on axially adjacent ones of the helical convolutions in response to the deforming step, respectively;

displacing the outer circumferential surface and the tooth tip rows of the core generally radially thereof in response to the compressing step and positively limiting the generally radial displacement of the outer circumferential surface and the tooth tip rows of the core thereby to predeterminately size the inner and outer circumferential surfaces of the core.

2. The method as set forth in claim 1 wherein the at least part of the one end face of the core comprises the tapered part of another of the helical convolutions at the one opposite end face of the core and wherein the deforming step includes applying another force generally equal and opposite to the first named force on only the tapered part of the another helical convolution at the one opposite end face of the core.

3. A method of predeterminately sizing both inner and outer circumferential surfaces of an edgewise wound core, the core including a lanced strip of generally thin ferromagnetic material having a pair of generally opposite edges and edgewise wound into a plurality of helical convolutions thereof accumulated in a generally annular and axially extending stack having a pair of generally opposite end faces thereby to comprise the core, the helical convolutions having on one of the opposite edges thereof a tapered section defining the outer circumferential surface of the core between the opposite end faces thereof, the method comprising the steps of:

exerting generally equal and opposite forces on only the tapered sections on the two helical convolutions at the opposite end faces of the core and deforming thereby the tapered sections on at least some of the axially adjacent ones of the helical convolutions generally axially across the core, respectively.

4. The method as set forth in claim 3 wherein the deforming step includes maintaining undeformed the tapered section of an axially intermediate one of the helical convolutions and engaging with the undeformed tapered section the deformed tapered sections on the helical convolutions axially adjacent the axially intermediate one helical convolution, respectively.

5. The method as set forth in claim 3 wherein the deforming step further includes engaging with each other the tapered sections of the axially adjacent ones of the helical convolutions and compressing together only the engaged tapered sections, respectively.

6. A method of predeterminately sizing the inner and outer circumferential surfaces of an edgewise wound core, the core including a lanced strip of generally thin ferromagnetic material having a pair of generally opposite edges and edgewise wound into a plurality of helical convolutions thereof accumulated into a generally annular and axially extending stack having a pair of generally opposite end faces thereby to comprise the core, the helical convolutions having on one of the opposite edges thereof a tapered section defining the outer circumferential surface of the core between the opposite end faces thereof, the method comprising the steps of:

exerting a force on only the tapered section on one of the helical convolutions at one of the opposite end faces of the core and successively deforming thereby only the tapered sections of adjacent ones of the helical convolutions generally axially across the core from the one opposite end face toward the other of the opposite end faces thereof, respectively.

7. The method as set forth in claim 6 wherein the successively deforming step includes engaging with each other the tapered sections of the adjacent ones of the helical convolutions and compressing together only the engaged tapered sections, respectively.

8. The method as set forth in claim 6 further comprising the additional step of displacing the outer circumferential surface of the core generally radially thereof and positively limiting the radial displacement of the outer circumferential surface thereby to effect the predetermined sizing thereof.

9. The method as set forth in claim 6 wherein the helical convolutions also have on the other of the opposite edges thereof a plurality of spaced apart tooth tip rows defining the inner circumferential surface of the core between the opposite end faces thereof, respectively, and wherein the method further comprises the additional step of displacing at least the tooth tip rows of the core generally radially thereof in response to the compression of the engaged tapered sections and positively limiting the radial displacement of the tooth tip rows thereby to effect the predetrrmined sizing of the inner circumferential surface of the core.

10. A method of predeterminately sizing an inner circumferential surface and an outer circumferential surface of a core having a pair of generally opposite end faces respectively interposed between the inner and outer circumferential surfaces and with a plurality of tooth tip rows on the core comprising the inner circumferential surface thereof, the method comprising the steps of:

compressing generally axially across the core only a circumferential section thereof defined between the opposite end faces at least generally adjacent the outer circumferential surface of the core; and displacing the outer circumferential surface and the tooth tip rows of tne core generally in radially opposite directions in response to the compressing step and positively limiting the displacement of the outer circumferential surface and the tooth tip rows in the generally radially opposite directions thereby to effect the predetermined sizing of the inner and outer circumferential surfaces, respectively.

11. The method as set forth in claim 10 wherein the compressing step includes supporting at least in part one of the opposite end faces of the core and exerting a force about only a part of the other of the opposite end faces of the core at least generally at the circumferential section thereof.

12. The method as set forth in claim 10 wherein the compressing step includes effecting the application of generally equal and opposite forces against only parts of the opposite end faces of the core at least generally the circumferential section thereof.

13. A method of predeterminately sizing an inner circumferential surface and an outer circumferential surface of an edgewise wound core, the core including a strip of generally thin ferromagnetic material having a preselected thickness between a pair of generally opposite edges thereof, one of the opposite edges defining along its length a yoke with a plurality of teeth extending therefrom on preselected pitch axes toward the other of the opposite edges and each tooth having a tip at least generally adjacent the other opposite edge, the lanced strip being edgewise wound into a plurality of generally helical convolutions accumulated in a generally annular stack thereof with the one edge, yoke, teeth and tooth tips of each helical convolution being generally axially aligned across the annular stack between a pair of generally opposite end faces thereof and with the tooth tips defining in part the inner circumferential surface and the one edge defining the outer circumferential surface of the annular stack, and a generally tapered section on the yoke generally adjacent the one opposite edge of each of the helical convolutions and having a thickness less than the preselected thickness of the lanced strip thereby to be generally axially spaced apart from each other between the opposite end faces of the annular stack, respectively, and apparatus including a pair of generally opposed dies and at least one of the dies having a generally annular beveled die surface thereon with a generally circular leading edge thereon, a generally cylindric sizing arbor, and a set of sizing jaws having open positions and closed mating positions, respectively, the method comprising the steps of:

arranging the annular stack in a preselected located position on the other of the opposed dies and placing thereby one of the opposite end faces of the annular stack in engagement with at least a part of the other opposed die;

engaging the circular leading edge of the beveled die surface on the at least one opposed die with the other of the opposite faces of the annular stack at least generally adjacent the outer circumferential surface thereof when the annular stack is in its preselected located position on the other opposed die and disposing thereby the annular beveled die surface generally in overlaying relation with the tapered section on the helical convolution at the other opposite end face of the annular stack;

containing the annular stack in its preselected located position between the opposed dies upon the occurrence of the engaging step;

associating the sizing arbor with the annular stack when contained in its preselected located position between the opposed dies and positioning thereby the sizing arbor generally in predetermined radially spaced apart relation with the tooth tips of the annular stack, respectively;

moving at least generally conjointly the sizing arbor and the opposed dies toward a position seating the other opposed die against further movement and maintaining the containment of the annular stack in its preselected located position between the opposed dies and also the predetermined spaced apart relation of the sizing arbor with the tooth tips of the annular stack, respectively;

disposing the outer circumferential surface of the annular stack between the sizing jaws in the open positions thereof at least when the other opposed die is in the seating position thereof;

actuating the sizing jaws from the open positions toward the closed mating positions thereof and arranging thereby the sizing jaws in predetermined spaced apart relation about the outer circumferential surface of the annular stack;

exerting a force on the at least one opposed die and moving thereby the at least one opposed die relative to the sizing arbor, the sizing jaws and the other opposed die in its seating position;

engaging only the annular beveled die surface on the at least one opposed die with the tapered section on the helical convolution at the other opposite end face of the annular stack and deforming thereby generally axially between the annular beveled die surface and the at least part of the other opposed die at least some of the axially adjacent ones of the tapered sections in response to the moving step, respectively;

abutting the deformed axially adjacent ones of the tapered sections with each other and compressing the annular stack generally axially across only the deformed axially adjacent ones of the tapered sections in abutment with each other between the annular beveled die surface and the at least part of the other opposed die in response to the deforming step; and expanding the outer circumferential surface of the annular stack generally radially outwardly thereof into sizing engagement with the sizing jaws in their closed mating positions thereby to predeterminately size the outer circumferential surface and effecting the displacement of the tooth tips of the annular stack generally radially inwardly thereof into sizing engagement with the sizing arbor thereby to predeterminately size the inner circumferential surface of the annular stack in response to the compressing step, respectively.

14. A method of predeterminately sizing an inner circumferential surface and an outer circumferential surface of an edgewise wound core, the core including a lanced strip of generally thin ferromagnetic material having a pair of generally opposite edges with one of the opposite edges being defined by a plurality of predeterminately spaced apart edge portions and with the lanced strip being edgewise wound into a plurality of generally helical convolutions accumulated in a generally annular stack thereof, the edge portions and the other of the opposite edges on each of the helical convolutions being generally axially aligned across the stack thereby to define the inner circumferential surface and the outer circumferential surface of the stack, respectively, and apparatus including a pair of opposed die means for relative movement, and a plurality of sizing means for disposition generally in concentric relation with each other, respectively, the method comprising the steps of:

associating at least a part of the opposed die means with the opposite faces of the annular stack at least generally adjacent the outer circumferential surface thereof and disposing the sizing means in the concentric relation thereof in predetermined spaced apart relation with the inner and outer circumferential surfaces on the annular stack;

effecting the relative movement of the opposed die means and compressing thereby only a circumferential portion adjacent the other opposite edge on each helical convolution in the annular stack generally axially thereof between only the at least parts of the opposed die means in the association thereof with the opposite end faces of the annular stack, respectively; and expanding the outer circumferential surface on the annular stack generally radially outwardly thereof into sizing engagement with one of the sizing means thereby to predeterminately size the outer circumferential surface and effecting the displacement of the aligned spaced apart edge portions on the annular stack generally radially inwardly thereof into sizing engagement with the other of the sizing means thereby to predeterminately size the inner circumferential surface of the annular stack in response to the effecting and compressing step, respectively.

15. The method as set forth in claim 14 wherein each helical convolution includes a reduced section at least generally adjacent the other opposite edge on the each helical convolution with the reduced section having a thickness less than a preselected thickness of the lanced strip prior to the edgewise winding thereof and with axially adjacent ones of the reduced sections defining the circumferential portion of the annular stack, and wherein the compressing step includes deforming at least some of the reduced sections generally axially between only the at leatt parts of the opposed die means and engaging thereby axially adjacent ones of the reduced sections with each other, respectively.

16. The method as set forth in claim 15 wherein the at least part of at least one of the opposed die means comprises a generally annular beveled die surface and wherein the compressing step further includes exerting a force on one of the at least one opposed die means and the other of the opposed die means and engaging thereby the beveled die surface only with the reduced section on the helical convolution at one of the opposite end faces of the stack, respectively.

17. The method as set forth in claim 15 wherein the at least parts of the opposed die means comprise a pair of generally annular and opposed beveled die surfaces and wherein the compressing step further includes exerting a force on at least one of the opposed die means and engaging thereby the opposed beveled die surfaces only with the reduced sections on the helical convolutions at the opposite end faces of the stack, respectively.

18. The method as set forth in claim 17 wherein the disposing step includes containing the annular stack in a preselected located position therefor between the at least parts of the opposed die means, respectively.

19. The method as set forth in claim 14 wherein the one sizing means comprises a set of sizing jaws and wherein the disposing step includes moving the sizing jaws between open positions and closed mating positions thereof in the predetermined spaced apart relation with the outer circumferential surface of the annular stack.

20. The method as set forth in claim 19 wherein the expanding step includes displacing the outer circumferential surface on the annular stack into the sizing engagement with the sizing jaws in the closed mating positions thereof, respectively.

21. The method as set forth in claim 14 wherein the other sizing means comprises a generally cylindric sizing arbor and wherein the disposing step includes moving the sizing arbor from a retracted position toward another position thereof in the predetermined spaced apart relation with the inner circumferential surface of the annular stack.

22. The method as set forth in claim 21 wherein the effecting step includes displacing the aligned spaced apart edge portions on the annular stack into the sizing engagement with the sizing arbor in its another position.

23. A method of predeterminately sizing a core, the core including a lanced strip ferromagnetic material having a pair of generally opposite edges and edgewise wound into a plurality of generally helical convolutions and axially stacked thereby to comprise the core, the opposite edges on the helical convolutions defining an inner circumferential surface and an outer circumferential surface of the core interposed between a pair of generally opposite end faces thereof and with the inner circumferential surface comprising a plurality of tooth tip rows aligned between the opposite faces of the core, respectively, and apparatus including a set of generally opposed die means operable generally for relative movement, and a plurality of sizing means operable generally for disposition in generally concentric spaced apart relation, respectively, the method comprising the steps of:

operating the sizing means and effecting thereby the disposition of the sizing means in predetermined radially spaced apart relation with the outer circumferential surface and the tooth tip rows of the core, respectively;

operating the opposed die means and compressing at least generally axially therebetween only a circumferential section of the core defined at least adjacent the outer circumferential surface between the opposite faces of the core; and displacing the outer circumferential surface and the tooth tip rows of the core into sizing engagement with the sizing means and predeterminately sizing thereby both the outer and inner circumferential surfaces of the core in response to the compressing step, respectively.

24. The method as set forth in claim 23 wherein the helical convolutions include a generally tapered section at least generally adjacent one of the opposite edges defining the outer circumferential surface and with the tapered sections of axially adjacent ones of the helical convolutions defining the circumferential section of the core, respectively, and wherein the compressing step includes deforming at least some of the tapered sections between the opposed die means and abutting together thereby the axially adjacent ones of the tapered sections, respectively.

25. The method as set forth in claim 24 wherein at least one of the opposed dies includes a generally annular beveled die surface and wherein the compressing step includes exerting a force at least one of the at least one opposed die means and the other of the opposed die means and engaging thereby the annular beveled die surface with only the tapered section of one of the helical convolutions at one of the opposite end faces of the core, respectively.

26. The method as set forth in claim 24 wherein the opposed die means include a pair of generally annular and opposed beveled die surfaces and wherein the compressing step includes exerting a force on at least one of the opposed die means and engaging thereby the opposed beveled die surfaces on the opposed die means only with the tapered sections of the helical convolutions at the opposite end faces of the core, respectively.

27. The method as set forth in claim 23 further comprising the preliminary step of containing the core in a preselected located position therefor between the opposed die means.

28. The method as set forth in claim 27 further comprising the further preliminary step of disposing one of the sizing means in the predetermined spaced apart relation with the tooth tip rows of the core and moving at least generally conjointly both the one sizing means and the opposed die means with the core contained therebetween toward a position placing the core within the other of the sizing means.

29. The method as set forth in claim 28 wherein the other of the sizing means includes a set of sizing jaws having open positions and closed mating positions and wherein the operating step includes moving the sizing jaws from the open positions into the closed mating positions thereof and placing thereby the sizing jaws in the predetermined spaced apart relation about the outer circumferential surface of the core, respectively.

30. A method of predeterminately sizing a core, the core including a stack of generally thin ferromagnetic material having a pair of generally opposite end faces interposed between a pair of generally radially spaced apart circumferential surfaces, and apparatus including a pair of opposed die means for relative movement, and a plurality of sizing means for disposition generally in concentric relation with each other, respectively, the method comprising the steps of:

associating at least a part of the opposed die means with the opposite end faces of the core and disposing the sizing means in predetermined spaced apart relation with the circumferential surfaces of the core;

effecting the relative movement of the opposed die means and compressing thereby only a circumferential portion of the core at least generally adjacent one of the circumferential surfaces between the opposed die means in the association thereof with the opposite and faces of the core, respectively; and displacing the circumferential surfaces of the core in generally radially opposite directions into sizing engagement with the sizing means thereby to predeterminately size the circumferential surfaces in response to the compressing step, respectively.

31. A method of predeterminately sizing a core, the core including a pair of generally opposite end faces with an outer circumferential surface extending generally axially between the opposite end faces, a lanced strip of generally thin ferromagnetic material having a pair of generally opposite edges and edgewise wound into a plurality of helical convolutions accumulated into a generally annular and axially extending stack thereby to comprise the core with leading and trailing ones of the helical convolutions respectively defining the opposite end faces, and the helical convolutions having a continuous tapered section at least adjacent one of the opposite edges for defining a circumferential section of the core between the opposite end faces at least adjacent the outer circumferential surafce, the method comprising the steps of:

axially deforming the circumferential section of the core between the opposite end faces;

exerting a force on the tapered section of at least one of the leading and trailing ones of the helical convolutions during the axially deforming step and compressing together the tapered sections of the helical convolutions generally axially across the core in response to the exerting step with the compressed together tapered sections forming the outer circumferential surface; and positively limiting radial displacement of at least the outer circumferential in response to the axially deforming step thereby to effect the predetermined sizing of the core.

32. A method of predeterminately sizing a core, the core including a pair of generally opposite end faces with an outer circumferential surface extending generally axially between the opposite end faces, a lanced strip of generally thin ferromagnetic material having a pair of generally opposite edges and edgewise wound into a plurality of helical convolutions accumulated into a generally annular and axially extending stack thereby to comprise the core with leading and trailing ones of the helical convolutions respectively defining the opposite end faces, and the helical convolutions having a continuous tapered section adjacent one of the opposite edges for defining a circumferential seciton of the core between the opposite end faces at least adjacent the outer circumferential suraface, and apparatus for effecting the sizing of the core including a pair of opposed dies with at least one of the opposed dies having a generally annular beveled surface, and a sizing ring, the method comprising the steps of:

axially compressing between the opposed dies the circumferential section of the core and engaging the annular beveled surface with the circumferential section at one of the opposite end faces during the axially compressing step;

abutting the tapered section of one of the leading and trailing ones of the helical convolutions with the annular beveled surface during the engaging step and deforming the tapered sections of at least some axially adjacent helical convolutions thereby to compress adjacent ones of the tapered sections into engagement with each other and form the outer circumferential surface; and radially deforming the outer circumferential surface into engagement with the sizing ring in response to the axially compressing step thereby to effect the predetermined sizing of at least the outer circumferential surface.

33. A method of predeterminately sizing a core, the core including a pair of generally opposite end faces with an outer circumferential surface extending generally axially between the opposite end faces, a lanced strip of generally thin ferromagnetic material having a pair of generally opposite edges and edgewise wound into a plurality of helical convolutions accumulated into a generally annular and axially extending stack thereby to comprise the core with leading and trailing ones of the helical convolutions defining the opposite end faces, and the helical convolutions having a continuous tapered section adjacent one of the opposite edges defining a circumferential section of the core at least adjacent the outer circumferential suraface, and apparatus for effecting the sizing of the core including a pair of opposed dies, a pair of opposed genrally annular beveled surfaces on the opposed dies, respectively, and a sizing ring, the method comprising the steps of:

axially compressing between the opposed dies the circumferential section of the core and engaging the opposed annular beveled surfaces with the circumferential section at the opposite end faces during the axially compressing step;

abutting the opposed annular beveled surfaces with the tapered sections of the leading and trailing ones of the helical convolutions during the engaging step, respectively, and deforming the tapered sections of at least some axially adjacent helical convolutions thereby to compress adjacent ones of the tapered sections into engagement with each other for defining the outer circumferential surface; and radially deforming the outer circumferential surface into engagement with the sizing ring in response to the axially compressing step thereby to effect the predetermined sizing of at least the outer circumferential surface.

34. The method as set forth in claim 33 wherein the core further includes an interrupted inner circumferential surface extending between the opposite end faces, the apparatus further including radially displacing the interrupted inner circumferential surface into engagement with the sizing arbor thereby to effect the predetermined sizing of the interrupted inner circumferential surface.

35. The method as set forth in claim 34 wherein the core further includes a plurality of rows of teeth extending generally axially between the opposite end faces and defining the interruped inner circumferential surface, the opposed dies including a pair of generally planar opposed surfaces, respectively, and wherein the abutting step includes engaging the opposed surfaces on the opposed dies with the opposite end faces to prevent axial distortion of the tooth rows.

36. The method as set forth in claim 31 wherein the core further includes an interruped inner circumferential surface extending between the opposite end faces and wherein the positively limiting step includes confining radial displacement of the interrupted inner circumferential surface in response to the radially deforming step thereby to effect the predetermined sizing of the interrupted inner circumferential surface.

37. The method as set forth in claim 32 wherein the core further includes an interrupted inner circumferential surface extending between the opposite end faces and the apparatus further includes radially displacing the interrupted inner circumferential surface into engagement with the sizing arbor thereby to effect the predetermined sizing of the interrupted inner circumferential surface.

38. The method as set forth in claim 37 wherein the lanced strip includes a plurality of spaced apart teeth terminating at least adjacent the other of the opposite edges with the teeth being aligned generally in a plurality of row formations thereof extending generally axially between the opposite end faces thereby to define the interrupted inner circumferential surface, the opposed dies including a pair of opposed surfaces, and wherein the abutting step includes engaging the opposed surfaces with the opposite end faces to prevent axial distortion of the teeth in row formations thereof.

39. The method as set forth in claim 36 wherein the lanced strip includes a plurality of spaced apart teeth terminating at least adjacent the other of the opposite edges, the teeth being aligned generally in a plurality of row formations thereof extending generally axially between the opposite end faces and defining the interrupted inner circumferential surface, and wherein the axially deforming step includes confining the teeth in the row formations thereof against axial displacement in response to the axially deforming step.

40. The method as set forth in claim 32 wherein the core further includes an interrupted inner circumferential surface extending between the opposite end faces, the apparatus further including a sizing arbor, and wherein the radially deforming step further includes radially displacing the interruped inner circumferential surface into engagement with the sizing arbor in response to the axially compressing step thereby to effect the predetermined sizing of the interrupted inner circumferential surface.

* * * * *